(12) United States Patent
Sugano et al.

(10) Patent No.: US 8,219,311 B2
(45) Date of Patent: Jul. 10, 2012

(54) HEADWAY DISTANCE MAINTENANCE ASSISTING SYSTEM AND METHOD

(75) Inventors: Takeshi Sugano, Yokohama (JP);
Yosuke Kobayashi, Yokohama (JP);
Nariaki Etori, Machida (JP); Masahiro Kobayashi, Ebina (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 844 days.

(21) Appl. No.: 12/256,164

(22) Filed: Oct. 22, 2008

(65) Prior Publication Data
US 2009/0105953 A1 Apr. 23, 2009

(30) Foreign Application Priority Data

Oct. 23, 2007 (JP) ................................. 2007-275679
Aug. 29, 2008 (JP) ................................. 2008-221320

(51) Int. Cl.
*G06F 17/10* (2006.01)
*G06F 7/78* (2006.01)
*G08G 1/16* (2006.01)
(52) U.S. Cl. ....................................................... 701/301
(58) Field of Classification Search .................... 701/93, 701/95, 96, 301; 180/170
See application file for complete search history.

(56) References Cited

U.S. PATENT DOCUMENTS

| | | | |
|---|---|---|---|
| 5,864,285 A * | 1/1999 | Wieder et al. ................. 340/435 |
| 6,989,738 B2 * | 1/2006 | Suzuki et al. ................. 340/436 |
| 7,124,010 B2 | 10/2006 | Egami | |
| 7,725,228 B2 * | 5/2010 | Kobayashi et al. ............. 701/45 |
| 7,822,526 B2 * | 10/2010 | Sugano et al. ................. 701/96 |
| 2003/0233187 A1 * | 12/2003 | Egami ............................ 701/96 |
| 2003/0236624 A1 * | 12/2003 | Kimura et al. ................. 701/301 |
| 2004/0085197 A1 * | 5/2004 | Watanabe et al. ............. 340/435 |
| 2004/0193351 A1 * | 9/2004 | Takahashi et al. ............. 701/70 |
| 2004/0225424 A1 | 11/2004 | Yamamura et al. | |
| 2007/0012499 A1 * | 1/2007 | Kobayashi et al. ........... 180/206 |
| 2007/0085667 A1 * | 4/2007 | Cicilloni et al. ............... 340/435 |
| 2007/0198136 A1 * | 8/2007 | Kobayashi et al. ............... 701/1 |
| 2007/0213916 A1 * | 9/2007 | Sugano et al. ................. 701/96 |
| 2008/0136275 A1 * | 6/2008 | Dreher ............................ 310/77 |
| 2010/0241329 A1 * | 9/2010 | Fujimura ........................ 701/70 |

(Continued)

FOREIGN PATENT DOCUMENTS

EP 1 375 280 A2 1/2004

(Continued)

OTHER PUBLICATIONS

Nissan Motor Company, Safety Activities Technology Overview, Nissan's Approach to Safety, Aug. 2006.

*Primary Examiner* — James Trammell
*Assistant Examiner* — Michael D Lang
(74) *Attorney, Agent, or Firm* — Foley & Lardner LLP

(57) ABSTRACT

A headway distance maintenance supporting system may include an obstacle detector, a controller configured for determining an operation reaction force to be generated in a driving operation equipment, and an operation reaction force generator for generating the operation reaction force in the driving operation equipment. The controller is configured for controlling the operation reaction force based on the status of a detected obstacle. The operation reaction force comprises a principal operation reaction force and an auxiliary operation reaction force, the auxiliary operation reaction force being no greater than the principal operation reaction force. The controller is configured for generating the auxiliary operation reaction force before a generation of the principal operation reaction force in the driving operation equipment.

18 Claims, 19 Drawing Sheets

U.S. PATENT DOCUMENTS

2010/0280729 A1 * 11/2010 Samsioe et al. .............. 701/93

FOREIGN PATENT DOCUMENTS

| EP | 1 400 435 B1 | 3/2004 |
| EP | 1 707 462 A1 | 10/2006 |
| EP | 1 749 724 A2 | 2/2007 |
| JP | 10-166890 A | 6/1998 |
| JP | 3573134 B2 | 7/2004 |
| JP | 3778165 B2 | 3/2006 |
| WO | WO 2005/084992 A1 | 9/2005 |

* cited by examiner

HEADWAY DISTANCE MAINTENANCE ASSISTING SYSTEM AND METHOD

CROSS-REFERENCE TO RELATED APPLICATIONS

This application claims priority to Japanese Patent Application Serial No. 2007-275679, filed on Oct. 23, 2007, and Japanese Patent Application Serial No. 2008-221320, filed on Aug. 29, 2008, each of which is incorporated herein by reference in its entirety.

TECHNICAL FIELD

The present invention pertains to a technology that assists the maintenance of vehicle headway distance.

BACKGROUND

A headway distance maintenance assisting system that changes the reaction force to operation of the accelerator pedal according to the headway distance from the preceding vehicle is described in Japanese Kokai Patent Application No. Hei 10[1998]-166890. With this system, the headway distance to the preceding vehicle is detected, and the reaction force acting on the accelerator pedal is increased in conjunction with a decrease in the headway distance from the preceding vehicle in order to arouse the driver's attention. On the other hand, when there is no preceding vehicle or the preceding vehicle is far ahead, control for changing the operation reaction force is not performed. In another scheme, there are devices characterized by the fact that when the presence of a preceding vehicle is detected, the reaction force is increased in pulsed fashion, and the driver's attention is aroused when this increased reaction force is noticed. Such a scheme is described in Japanese Patent No. 3573134.

SUMMARY

Disclosed herein is a headway distance maintenance supporting system for a given vehicle that provides an improved support running of a given vehicle. According to one embodiment of the present invention, a headway distance maintenance supporting system may include an obstacle detector for detecting status of obstacles present in front of the given vehicle, a controller configured for determining an operation reaction force to be generated in a driving operation equipment used by a driver of the given vehicle, and an operation reaction force generator for generating the operation reaction force in the driving operation equipment based on the operation reaction force determined by the controller. The controller is configured for controlling the operation reaction force generated by the operation reaction force generator in the driving operation equipment based on the status of a detected obstacle detected by the obstacle detector. The operation reaction force determined by the controller comprises a principal operation reaction force and an auxiliary operation reaction force, the auxiliary operation reaction force being no greater than the principal operation reaction force. The controller is configured for generating the auxiliary operation reaction force before a generation of the principal operation reaction force in the driving operation equipment.

According to another embodiment of the present invention, a headway distance maintenance supporting method for a given vehicle may include detecting status of at least one obstacle present in front of the given vehicle, computing a principal operation reaction force and an auxiliary operation reaction force no greater than said principal operation reaction force generated in a driving operation equipment used by the driver of the given vehicle based on the status of a detected obstacle, and generating the auxiliary operation reaction force before generating the principal operation reaction force in the driving operation equipment.

According to another embodiment of the present invention, a computer readable storage medium, having stored data for headway distance maintenance supporting methods for a given vehicle, wherein the computer readable storage medium stores a program for providing instructions for detecting status of at least one of obstacle present in front of the given vehicle, instructions for computing a principal operation reaction force and an auxiliary operation reaction force no greater than said principal operation reaction force generated in a driving operation equipment used by the driver of the given vehicle based on the status of a detected obstacle, and instructions for generating the auxiliary operation reaction force before generating the principal operation reaction force in the driving operation equipment. It is to be understood that both the foregoing general description and the following detailed descriptions are exemplary and explanatory only, and are not restrictive of the invention as claimed.

BRIEF DESCRIPTION OF DRAWINGS

These and other features, aspect, and advantages of the present invention will become apparent from the following description, appended claims, and the accompanying exemplary embodiments shown in the drawings, which are briefly described below.

DETAILED DESCRIPTION

In the device described in Japanese Kokai Patent Application No. Hei 10[1998]-166890, if the headway distance from the preceding vehicle gradually shortens, the accelerator pedal reaction force is also changed gradually. Consequently, the driver scarcely notices the change in the accelerator pedal reaction force. On the other hand, in the device described in Japanese Patent No. 3573134, the reaction force is increased only momentarily when a preceding vehicle is detected, so that when the headway distance to the preceding vehicle shortens gradually, the accelerator pedal reaction force also changes gradually, so that the driver scarcely notices the change in accelerator pedal reaction force.

Embodiment 1

Figure 1:
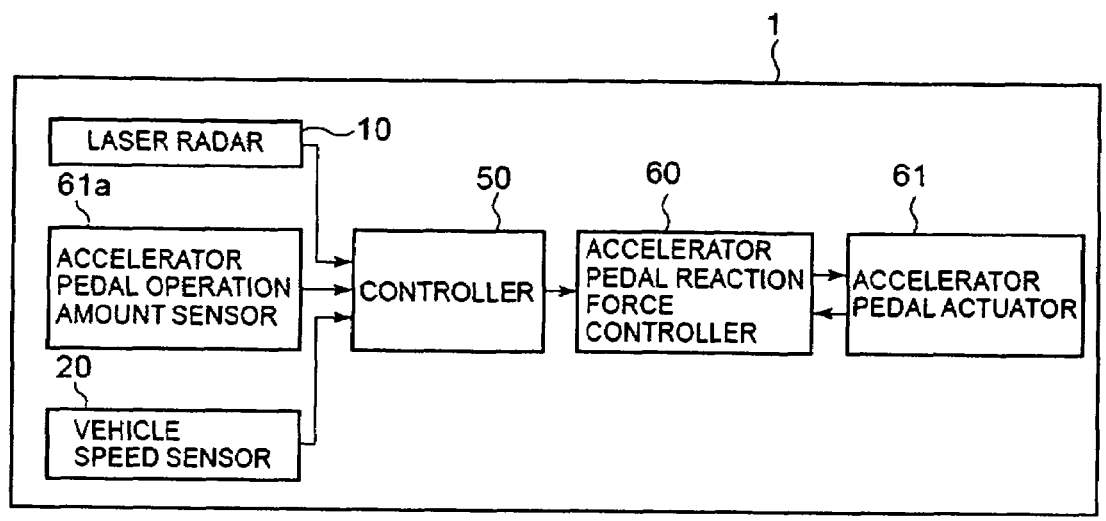
FIG. 1 is a system diagram showing the headway distance maintenance supporting system according to an embodiment of the present invention.
Figure 2:
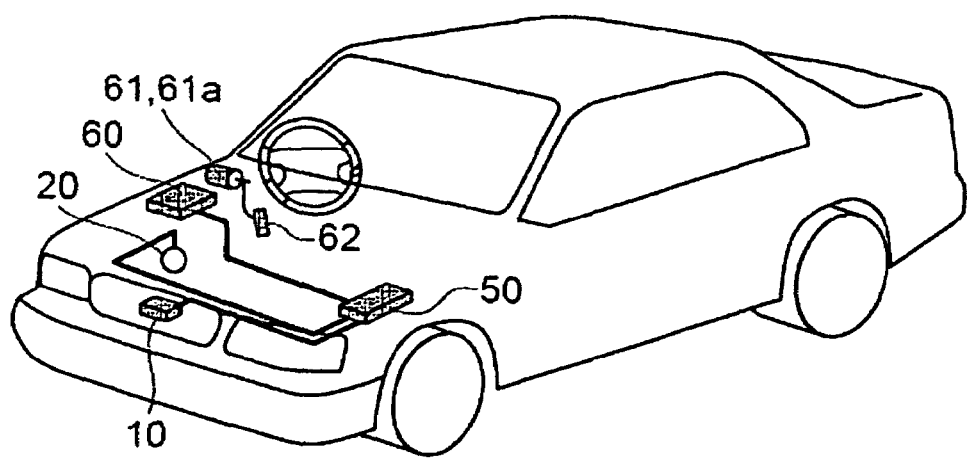
FIG. 2 is a diagram schematically showing a vehicle that carries a headway distance maintenance supporting system according to an embodiment of the present invention.

In the following description, the headway distance maintenance supporting system and method according to one embodiment of the present invention which solves the aforementioned problems will be explained with reference to FIGS. 1-15. FIG. 1 is a system diagram showing the headway distance maintenance supporting system 1. FIG. 2 is a diagram schematically showing a vehicle that carries headway distance maintenance supporting system 1.

First of all, the headway distance maintenance supporting system 1 will be explained. Here, laser radar 10 is attached to the front grille or front bumper of the given vehicle, and it scans horizontally with IR light pulses. Laser radar 10 measures the IR light pulse reflections from plural reflectors (usually the back end of the preceding vehicle) ahead of the given vehicle, and detects the headway distance for each of plural preceding vehicles and their directions from the arrival times of the reflected waves. The detected headway distances and their directions are output to controller 50. In this embodiment, the direction of a forward object can be represented by its angle relative to the given vehicle. The forward region scanned by laser radar 10 is about ±6° with respect to the front of the given vehicle, and forward objects present within the range are detected.

For example, controller 50 may include a microcomputer, and it performs overall control of headway distance maintenance supporting system 1. Controller 50 detects the status of obstacles in the surroundings of the given vehicle from the given vehicle speed input from vehicle speed sensor 20 and the distance information input from laser radar 10. Based on the status of these obstacles, controller 50 computes first and second headway distance thresholds, to be explained later. In addition, controller 50 performs control corresponding to the first and second headway distance thresholds.

By controlling the reaction force generated when the accelerator pedal is depressed, headway distance maintenance supporting system 1 can appropriately assist the driving operations of the driver. Here, controller 50 computes the first and second headway distance threshold from the status of the obstacles. Controller 50 then computes the target pedal reaction force with respect to the computed first and second headway distance thresholds. Then controller 50 outputs the computed target pedal reaction force to accelerator pedal reaction force controller 60.

Accelerator pedal reaction force controller 60 controls the torque generated in accelerator pedal actuator 61 corresponding to the reaction force control amount output from controller 50. Accelerator pedal actuator 61, which is assembled with accelerator pedal 62, can generate any level of operation reaction force for accelerator pedal 62 according to the value of the instruction from accelerator pedal reaction force controller 60. As a result, the depressing force generated when the driver depresses accelerator pedal 62, which may be the driving operation equipment, can be controlled as desired.

Arranged in accelerator pedal actuator 61 are an output shaft, not shown in the figure, and sensor 61a for detecting the rotational position of the output shaft. The output shaft is connected to a rotational shaft, not shown in the figure, of accelerator pedal 62. The rotational position of the output shaft detected by sensor 61a uniquely corresponds to the operation amount of accelerator pedal 62. Consequently, sensor 61a is used in the present embodiment as the accelerator pedal operation amount sensor that detects the operation amount of accelerator pedal 62.

Figure 3:
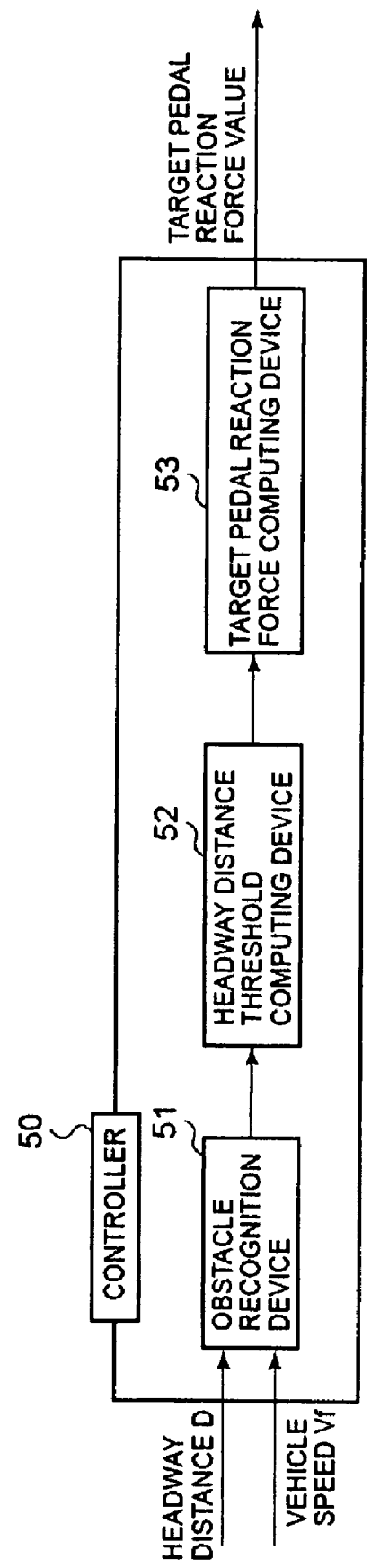
FIG. 3 is a block diagram showing a controller of the headway distance maintenance supporting system according to an embodiment of the present invention.

FIG. 3 is a block diagram showing controller 50. Obstacle recognition device 51 computes the headway distance and relative speed with respect to the preceding vehicle (forward vehicle) based on the signal input from laser radar 10. Then the status of the obstacles ahead of the given vehicle is detected based on the headway distance and relative speed with respect to the preceding vehicle, as well as the given vehicle speed input from vehicle speed sensor 20. Based on the result of computation by obstacle recognition device 51, headway distance threshold computing device 52 computes the first and second headway distance thresholds. The accelerator pedal reaction force applied on the accelerator pedal is determined by target pedal reaction force determining device 53 based on the first and second headway distance thresholds and the headway distance.

Figure 4:
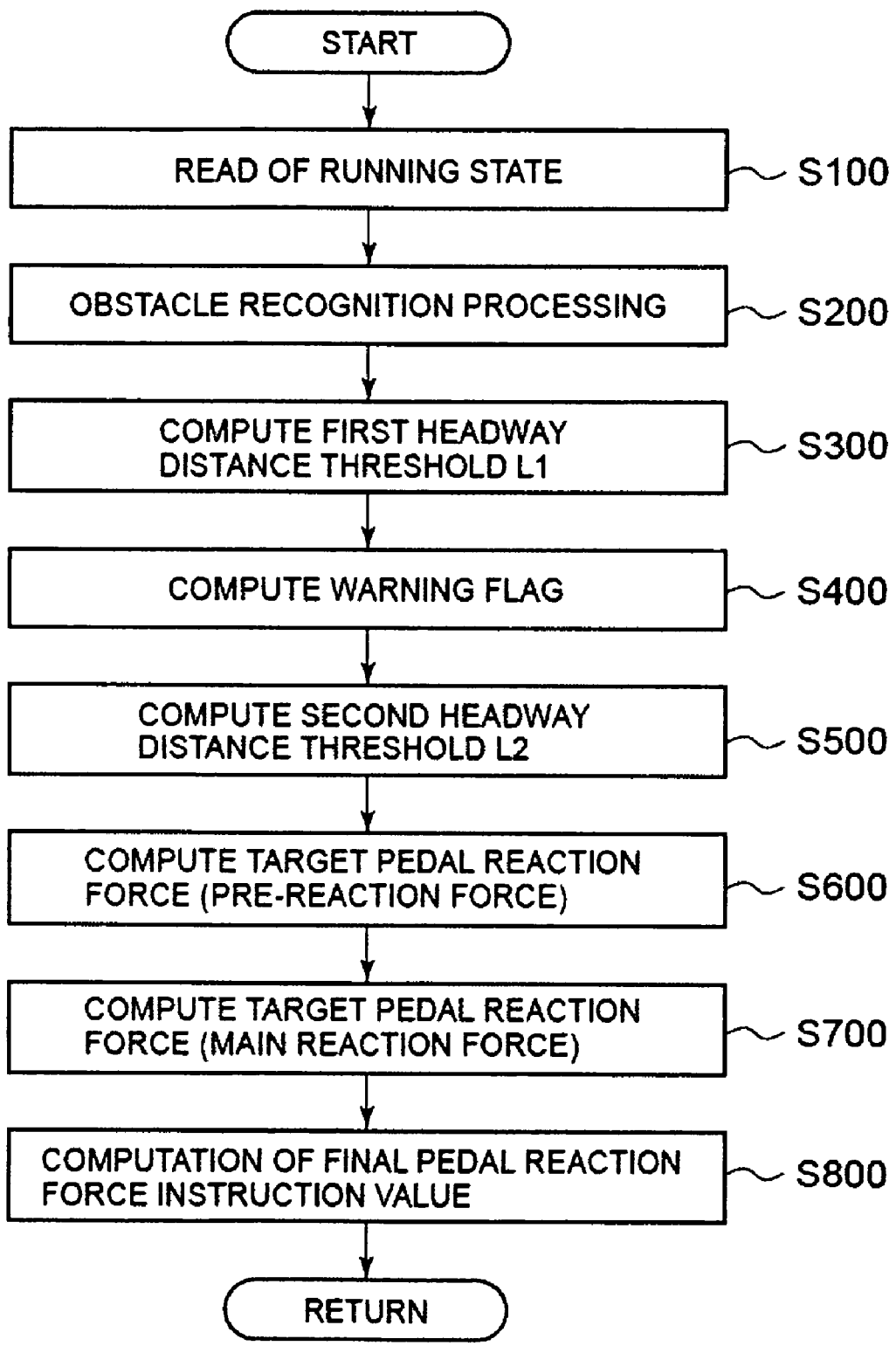
FIG. 4 is a flow chart illustrating a process of headway distance maintenance supporting control.
Figure 5:
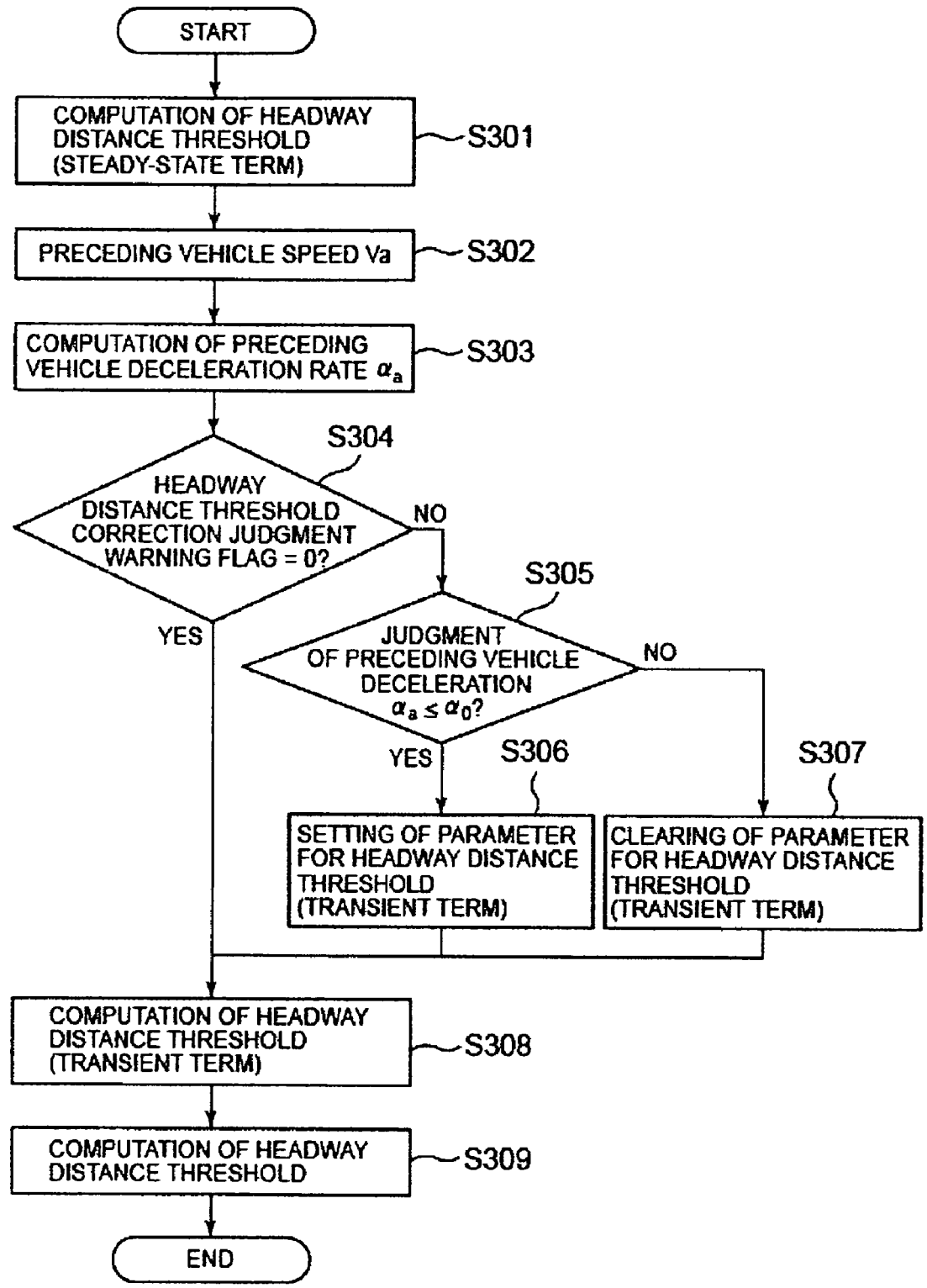
FIG. 5 is a flow chart illustrating a processing procedure for computing a first headway distance threshold $L^*_1$.

In the following, the operation of headway distance maintenance supporting system 1 in this embodiment will be explained. First of all, a brief account of its operation will be provided. FIG. 4 is a flow chart illustrating a process of headway distance maintenance supporting control performed in controller 50. This processing content is successively performed at prescribed intervals, such as 10 msec.

First, the running status of the given vehicle is read in step S100. Here, the running status refers to the information about the running status of the given vehicle, including the status of obstacles ahead of the given vehicle. More specifically, the headway distance and the direction of forward obstacles (preceding vehicles) detected by laser radar 10 and the speed of the given vehicle detected by vehicle speed sensor 20 are read.

In step S200, based on the running status data read and recognized in step S100, the status of the front obstacles is recognized. Here, the relative position and movement direction/movement speed of the current obstacle with respect to the given vehicle are recognized from the relative position and movement direction/movement speed of the obstacle with respect to the given vehicle that was detected in the last processing cycle (i.e., previously detected) and stored in a memory, not shown in the figure, as well as the current running status data obtained in step S100. The obstacle with respect to travel of the given vehicle is recognized by how it is placed ahead of the given vehicle and how it moves relative to it.

In step S300, first headway distance threshold $L^*_1$ with respect to the obstacle is computed. In the following, the processing performed in this case will be explained with reference to the flow chart shown in FIG. 5.

In step S301, headway distance threshold (steady-state term) $L^*_{h1}$ is computed. Here, the headway distance threshold (steady-state term) is the item corresponding to when the preceding vehicle travels at a constant speed. In this example, it is set corresponding to relative speed Vr between the given vehicle speed VSP and the obstacle (preceding vehicle).

$$L^*_{h1}=f(VSP,Vr)$$

In step S302, the preceding vehicle speed Va is computed from the given vehicle's speed VSP and relative speed Vr, recognized in step S100 and step S200, using Equation (1).

$$Va=VSP+Vr \quad (1)$$

In step S303, the accelerator/deceleration rate $a$, of the preceding vehicle is computed.

$$\alpha a=d(Va)/dt \quad (2)$$

In step S304, as a condition for computing and refreshing the headway distance threshold (transient term), judgment is made as to whether warning flag Fw, computed in step S400 and to be explained later, is set.

1) If the warning flag is not set (Fw=OFF), the process proceeds to step S305.
2) If the warning flag is set (Fw=ON), the process proceeds to step S308 without refreshing the parameters for the headway distance threshold (transient term).

In step S305, a judgment is made on the deceleration of the preceding vehicle. In this example, judgment is made as to whether the deceleration of the preceding vehicle is lower than a prescribed level.

1) If the accelerator/deceleration of the preceding vehicle is lower than a prescribed level ($\alpha a \leq \alpha 0$), preceding vehicle deceleration judgment flag Fdec_a is turned ON.
2) Otherwise ($\alpha a > \alpha 0$), preceding vehicle deceleration judgment flag Fdec_a is turned OFF.

Here, $\alpha 0$ represents the threshold for judging deceleration. Here, for both accelerator/deceleration $\alpha a$ of the preceding vehicle and deceleration judgment threshold $\alpha 0$, the value for acceleration is positive, and for deceleration it is negative.

In step S306, when it is judged that the preceding vehicle has decelerated in step S305, the following equation is used to compute and refresh parameter Tr1 for the headway distance threshold (transient term).

$$Tr1=(L-L^*_{h1})/Vr \quad (3)$$

In this equation, Tr1 represents the margin distance, represented as a relative speed time coefficient, of actual headway distance L with respect to headway distance threshold (steady-state term) $L^*h1$ at the time that the preceding vehicle started deceleration.

In step S307, when it is judged in step S305 that the preceding vehicle has not decelerated, parameter Tr1 for the headway distance threshold (transient term) is cleared.

$$Tr1=0 \quad (4)$$

In step S308, headway distance (transient term) $L^*_{r1}$ is computed using the following equation.

$$L^*_{r1}=Tr1 \times Vr \quad (5)$$

In step S309, first headway distance threshold $L^*_1$ is computed. In this embodiment it is computed as the sum of headway distance threshold (steady-state term) $L^*h1$ and headway distance (transient term) $L^*_{r1}$ according to the following equation.

$$L^*_1=L^*_{h1}+L^*_{r1} \quad (6)$$

In step S400, the warning flag is set/cleared.
1) When $L^*_1>L$, warning flag Fw is turned ON.
2) Otherwise ($L^*_1 \leq L$), warning flag Fw is turned OFF.

Second headway distance threshold $L^*_2$ with reference to the obstacle is computed in step S500. Here, second headway distance threshold $L^*_2$ has a value larger than that of the first headway distance threshold $L^*_1$ ($L^*_1<L^*_2$). In the following, the processing to compute the second headway distance threshold performed in step S500 will be explained in more detail with reference to FIGS. 6-10.

Figure 6:
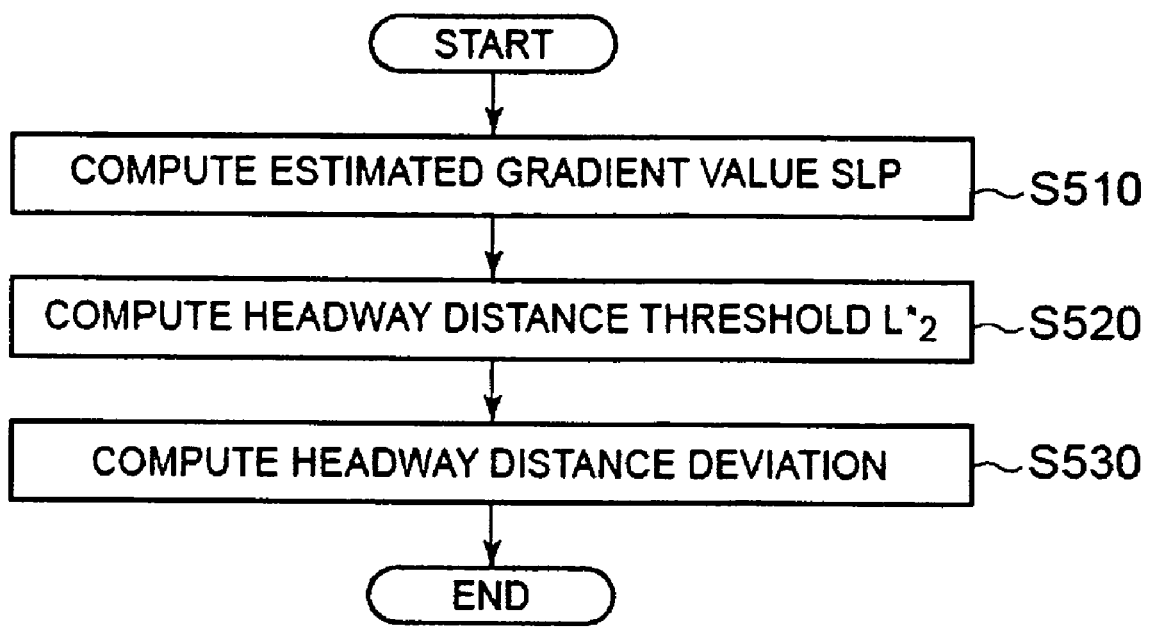
FIG. 6 is a flow chart illustrating a processing procedure for computing a second headway distance threshold $L^*_2$.

The processing performed in step S500 is performed according to the flow chart shown in FIG. 6.

In step S510, the gradient of the road on which the given vehicle runs is estimated.

First of all, assuming the torque amplification ratio of the engine torque torque converter to be $R_t$, the automatic transmission gear ratio to be $R_{at}$, and the differential gear ratio to be $R_{def}$, the relationship between driving shaft torque Tw and engine torque Te is expressed by the following equation.

$$Tw=R_tR_{at}R_{def}T_e \quad (7)$$

Also, assuming the area of the brake cylinder to be $A_b$, the rotor effective radius to be $R_b$, and the pad friction coefficient to be $\mu b$, the relationship between brake hydraulic pressure instruction value $P_{br}$ and brake torque $T_{br}$ is expressed by the following equation.

$$T_{br}=8A_bR_b\mu_bP_{br} \quad (8)$$

In addition, air resistance $F_a$ and rolling resistance $F_r$ acting on the given vehicle can be computed using the following equations.

$$F_a=\mu_a s_v VSP^2 \quad (9)$$

$$F_r=\mu_r M_v g \quad (10)$$

Here, $\mu_a$ represents the air resistance coefficient, $s_v$ represents the frontal projected area of the given vehicle, $\mu_r$ represents the rolling resistance coefficient, $M_v$ represents the weight of the given vehicle, and g represents the acceleration due to gravity.

The acceleration of the given vehicle is estimated from the driving shaft torque generated from engine torque and brake hydraulic pressure, as well as the air resistance and rolling resistance, and it is compared to the actual acceleration. As a result, gradient SLP of the road where the given vehicle runs can be estimated using the following Equation (11).

$$SLP=\{T_w-T_{br}-R_w(F_a+F_r)\}/M_vR_w \cdot s \cdot VSP \quad (11)$$

Here, s is a Laplace operator, $R_w$ is a coefficient for computing the gradient Second headway distance threshold $L^*_2$ is computed in step S520. In the following, the processing for computing the second headway distance threshold performed in step S520 will be explained in more detail with reference to FIGS. 7-9.

Figure 7:
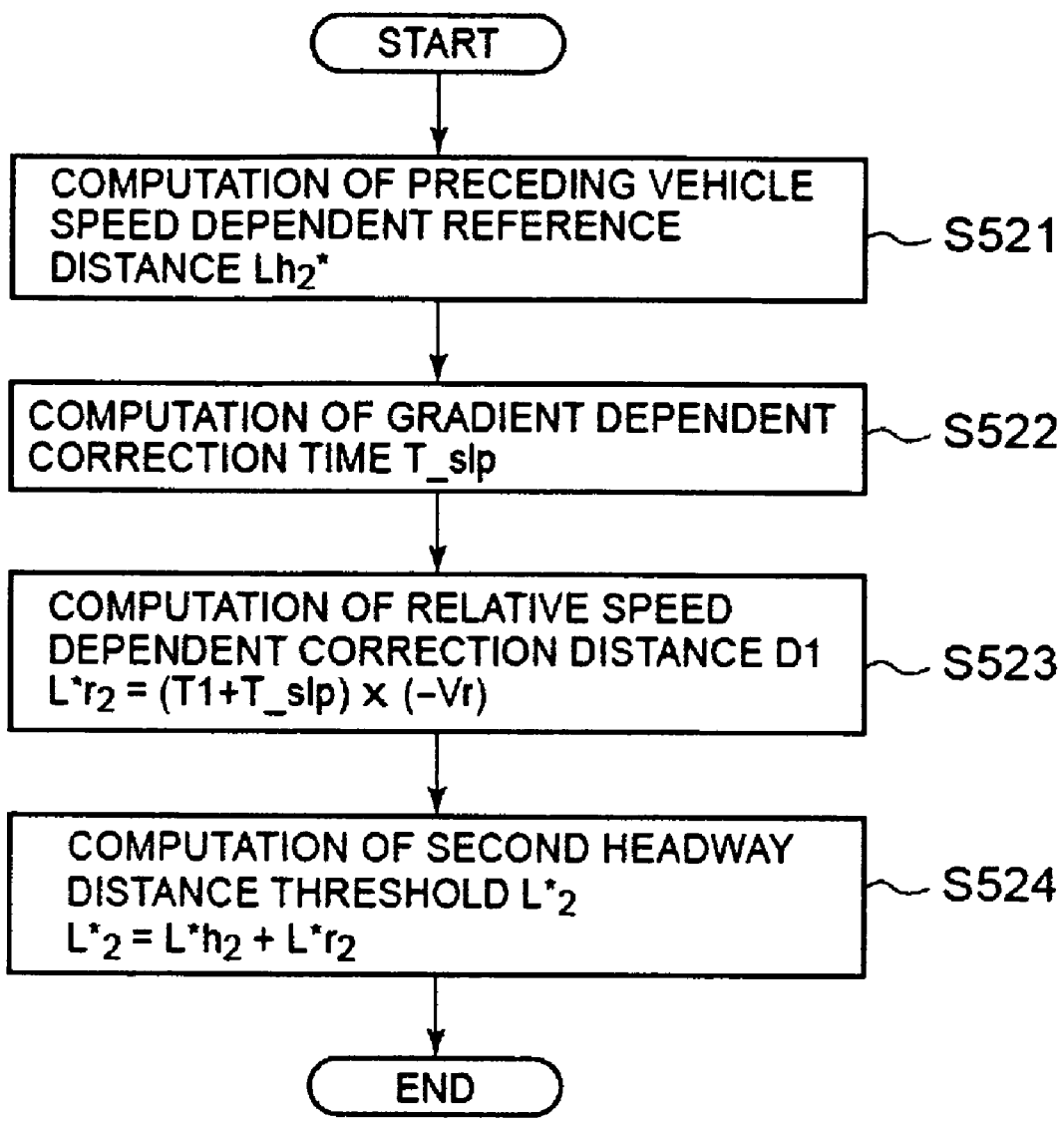
FIG. 7 is a flow chart illustrating a processing procedure for step S520 of FIG. 6.

The processing performed in step S520 is performed according to the flow chart shown in FIG. 7.

Figure 8:
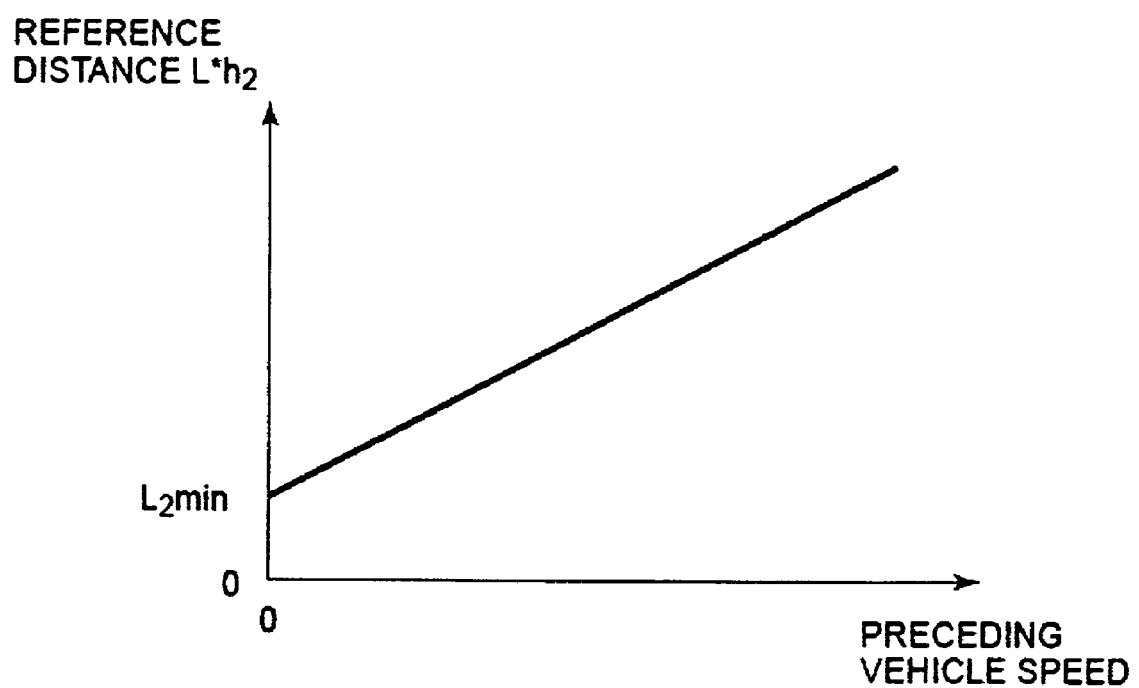
FIG. 8 is a diagram showing a reference distance $L^*h2$ based on preceding vehicle speed.

In step S521, preceding vehicle speed dependent reference distance $L^*_{h2}$ is computed from the map shown in FIG. 8. As shown in FIG. 8, the preceding vehicle dependent reference distance $L^*_{h2}$ is computed such that the engine torque output quantity with respect to the accelerator pedal depression amount is controlled from a greater distance when the preceding vehicle speed is higher.

Figure 9:
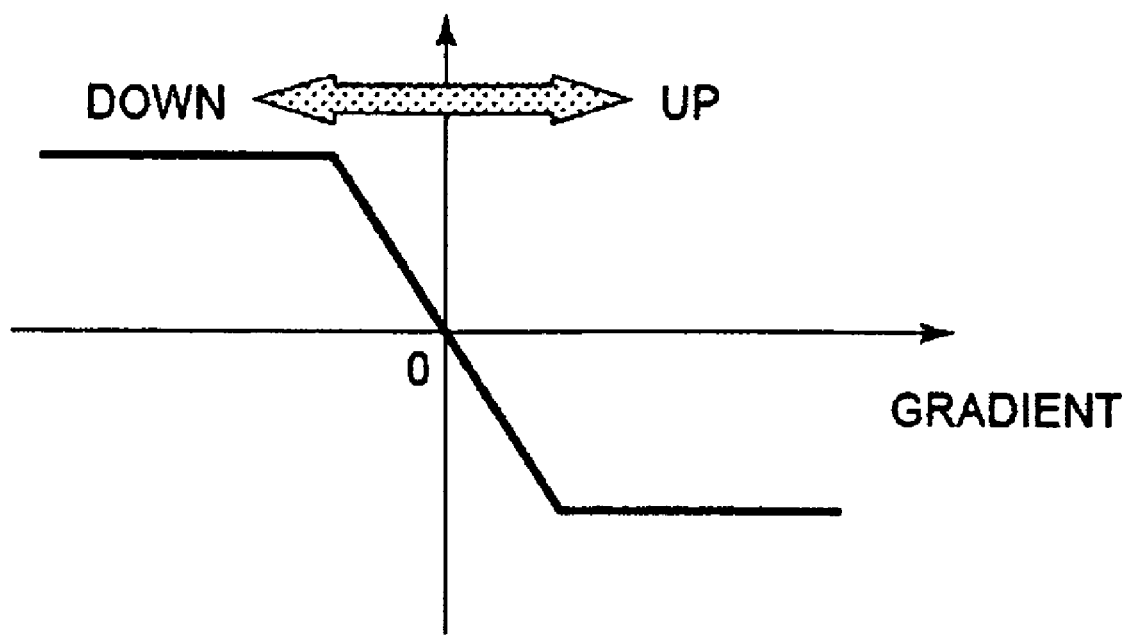
FIG. 9 is a diagram showing a gradient dependent correction time T_slp based on the gradient.

In step S522, gradient dependent correction time T_slp is computed from the map shown in FIG. 9. As shown in FIG. 9, when the gradient is positive, that is, when the given vehicle travels uphill, the gradient dependent correction time has a negative value. On the other hand, when the gradient is negative, that is, when the given vehicle travels downhill, it is set to be a positive value. Also, for a larger absolute value of the gradient, the absolute value of the gradient dependent correction time is set larger. In addition, when the absolute value of the gradient is larger than a prescribed value, the absolute value of the gradient dependent correction time is fixed at a prescribed value. The preceding vehicle dependent reference distance computed in step S521 is corrected by multiplying relative speed Vr with respect to the obstacle by the gradient dependent correction time T_slp. The processing for correcting the preceding vehicle dependent reference distance will be explained later.

Relative speed dependent correction distance $L^*_{r2}$ is computed in step S523. The following equation is used to compute relative speed dependent correction distance $L^*_{r2}$ from prescribed reference time T1 and gradient dependent correction time T_slp computed in step S522.

$$L^*_{r2} = (T1 + T\_slp) \cdot (-Vr) \quad (12)$$

Second headway distance threshold $L^*_2$ is computed in step S524. Second headway distance threshold $L^*_2$ is computed from preceding vehicle speed dependent reference distance $L^*_{h2}$ computed in step S521 and relative speed dependent correction distance $L^*_{r2}$ using the following equation.

$$L^*_2 = L^*_{h2} + L^*_{r2} \quad (13)$$

In step S530, the deviation of the headway distance is computed from actual headway distance L and second headway distance threshold $L^*_2$.

Figure 10:
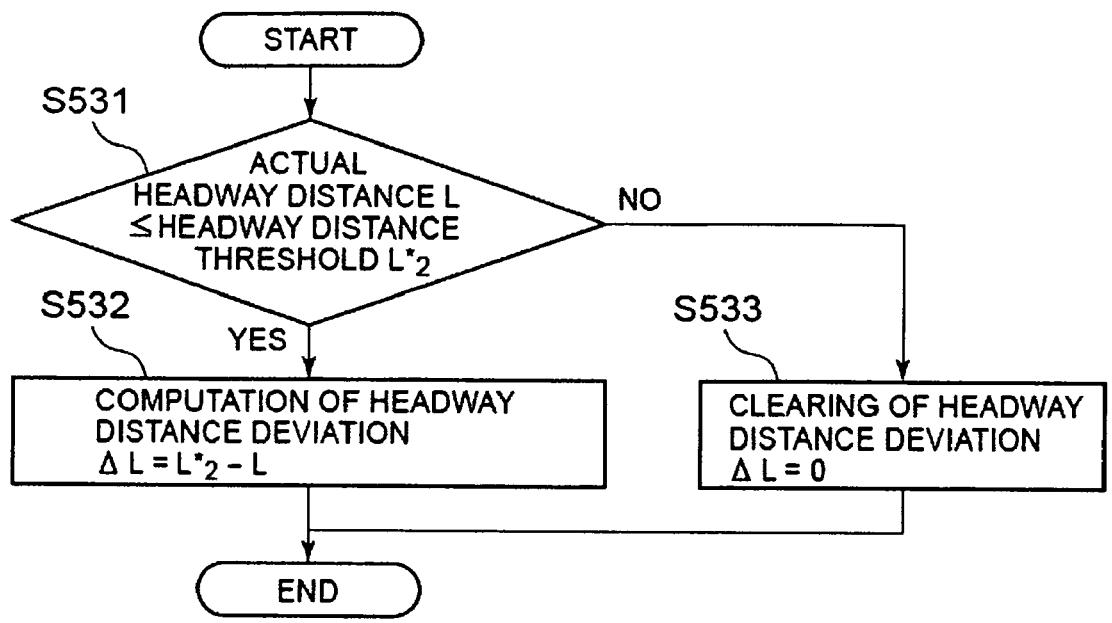
FIG. 10 is a flow chart illustrating a processing procedure for step S530 of FIG. 6.

The processing performed in step S530 is performed according to the flow chart shown in FIG. 10.

In step S531, judgment is made as to whether actual headway distance L is less than second headway distance threshold $L^*_2$. If the judgment result is YES, the process proceeds to step S532, and headway distance deviation $\Delta L_2$ is computed according to the following equation.

$$\Delta L_2 = L^*_2 - L \quad (14)$$

If the judgment result in step S531 is NO, the process proceeds to step S533 and headway distance deviation $\Delta L_2$ is cleared.

The Auxiliary Operation Reaction Force

Figure 11:
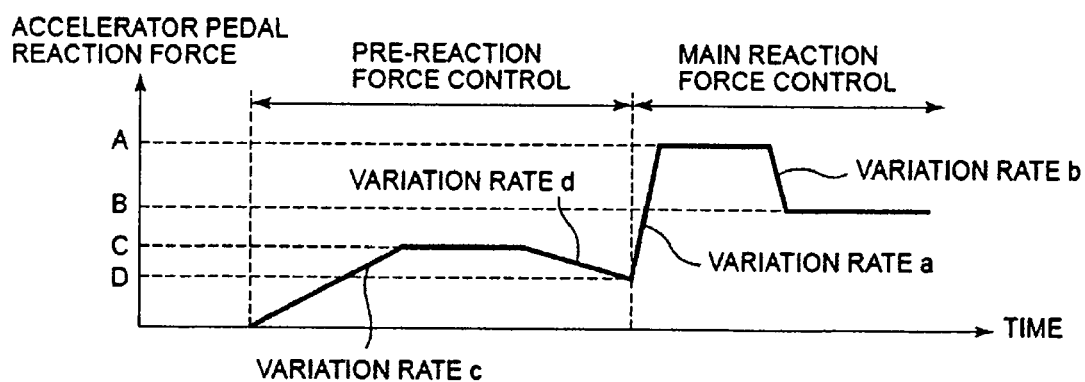
FIG. 11 is a diagram illustrating the time chart of the control of the auxiliary operation reaction force and control of the principal operation reaction force.
Figure 12:
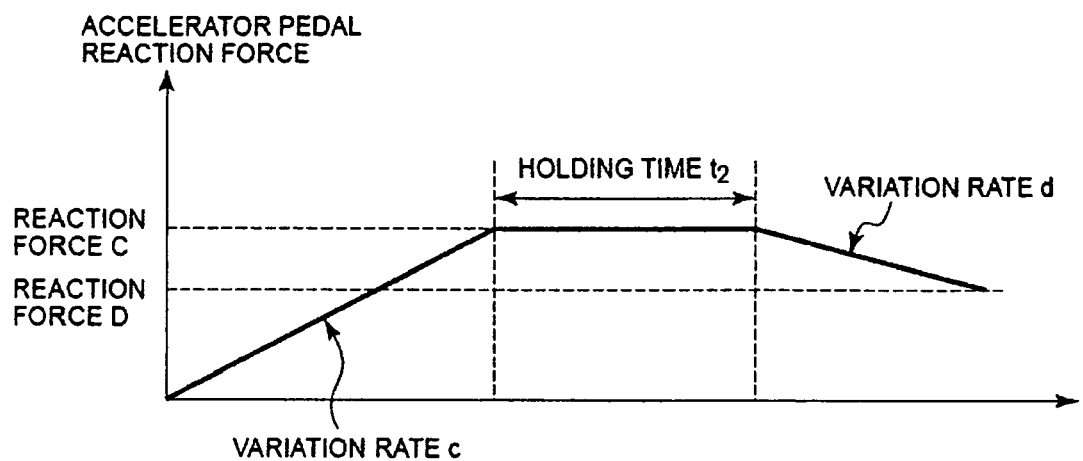
FIG. 12 is a diagram illustrating the time chart of the control of the auxiliary operation reaction force.

In headway distance maintenance supporting system 1 of this embodiment, when actual headway distance L is equal to or shorter than second headway distance threshold $L^*_2$ ($L \leq L^*_2$), the auxiliary target accelerator pedal reaction force (auxiliary operation reaction force) Tp, to be explained later, is generated. The auxiliary operation reaction force is also called pre-reaction force. In the scenario for generating the auxiliary operation reaction force, in a case in which the preceding vehicle is approached, the degree of proximity is assumed to enable maintenance of the headway distance when accelerator operation is performed. As shown in FIG. 11, the auxiliary operation reaction force is effected before generation of the principal operation reaction force, to be explained later. Target accelerator pedal reaction force $\tau p$ is computed in step S600 shown in FIG. 4. Also, more specifically, target accelerator pedal reaction force p is generated as shown in FIG. 12.

In the following discussion, the series of operations involving the auxiliary operation reaction force will be explained. The auxiliary operation reaction force increases at a variation rate of c until reaching reaction force C. After holding for a prescribed time t2 at reaction force C, the reaction force is reduced to reaction force D at variation rate d. Here, reaction force C and variation rate c are considered to be the reaction force value (reaction force value C) and variation rate that allow the driver to notice the reaction force in a state in which there is relatively significant latitude for motion, such that the headway distance is maintained while the driver performs accelerator operation, and holding time t2 is about 1 sec. By generating the auxiliary operation reaction force in this way, it is possible to support the leaving of the accelerator pedal operation to be performed by the driver according to the proximity to the preceding vehicle. Also, variation rate d has a value smaller than variation rate c, and the value of reaction force D (reaction force value D) is smaller than that of reaction force value C, so that it is possible to reduce the reaction force while suppressing any uneasy feeling caused by releasing the reaction force. By having the value of variation rate d smaller than that of variation rate c, it is possible for the later generated principal operation reaction force (to be explained later) to be transmitted efficiently to the driver.

Figure 13:
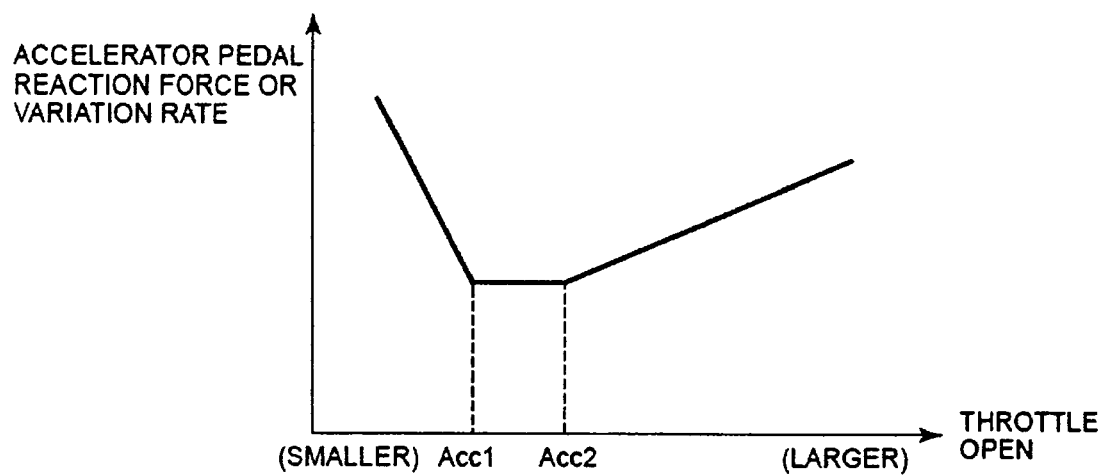
FIG. 13 is a diagram illustrating the relationship between the accelerator operation and reaction force values C, D or variation rate c.

Also, when the operation amount (depression distance) of the accelerator pedal is small, a change in the operation reaction force is difficult to transmit to the driver. Consequently, a scheme should be adopted in which the prescribed reaction force values C, D, and variation rate c are changed according to throttle opening Acc. For example, as shown in FIG. 13, in the region where throttle opening is smaller than Acc1, the smaller the throttle opening, the larger the reaction force values C, D. As a result, even when the accelerator operation amount by the driver is small, a larger reaction force can still be applied, so that the driver will notice the accelerator reaction force. On the other hand, when the throttle opening is larger than Acc1 and smaller than Acc2 (Acc1<Acc2), reaction force values C, D are constant. When the throttle opening is between Acc1 and Acc2, the accelerator operation amount corresponds to the conventionally used region. In this case, if the accelerator reaction force is too high, the driver may feel uneasy. Consequently, it is reduced to a level that causes no uneasy feeling. In addition, in the region where the throttle opening is larger than Acc2, the larger the throttle opening, the larger the reaction force values C, D. When the throttle opening is large, because the driver depresses the accelerator forcibly, the driver will hardly notice the reaction force if it is small. Consequently, by increasing the reaction force value in this case, the driver can be aroused to notice the reaction force. Such a map is not limited to reaction force values C, D, but can also be adopted for variation rate c.

Figure 14:
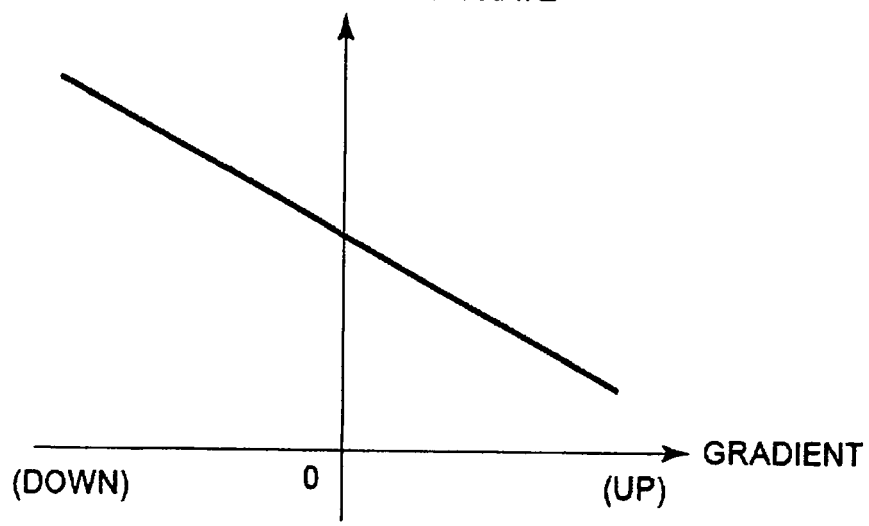
FIG. 14 is a diagram illustrating the relationship between the gradient of the road surface and reaction force values C, D or variation rate c.

Also, the prescribed reaction force values C, D and the prescribed variation rate c can be changed according to the gradient of the road surface. As shown in FIG. 14, when the gradient has a positive value, that is, when the given vehicle climbs a slope, it is possible by reducing the reaction force to prevent an excessive accelerator pedal reaction force so that any uneasy feeling can be minimized. As explained above, the gradient is determined from Equation (11) in step S510.

Figure 23:
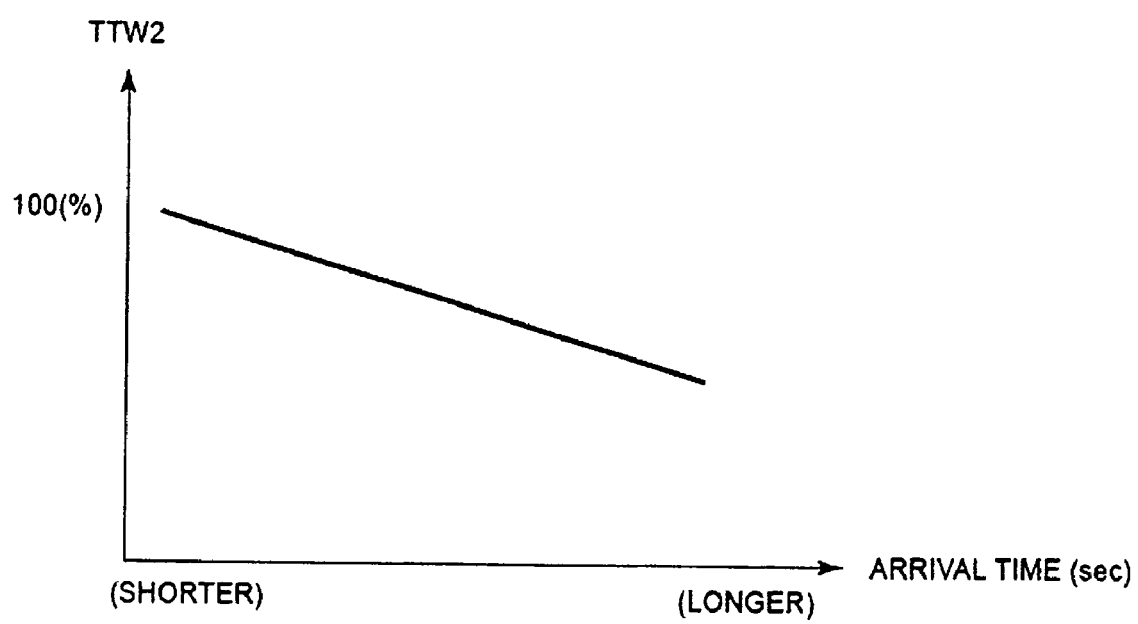
FIG. 23 is a diagram illustrating the relationship between the arrival time and the correction value TTW2.

Also, the prescribed reaction force values C, D and prescribed variation rate c can be changed according to the time of arrival at headway distance threshold $L*_1$ for generation of the principal operation reaction force. Please see the following (for computation of the arrival time and of the reaction force value). As shown in FIG. 23, TTW2 represents the correction value corresponding to the arrival time. It has a larger value when the arrival time is shorter, and a smaller value when the arrival time is longer. By having a smaller value of TTW2 when the arrival time is longer, it is possible to use a smaller reaction force, to prevent excessive accelerator pedal reaction force and reduce any uneasy feeling.

Arrival time=$(L*_2-L*_1)$/(relative speed)

Reaction force value(after correction)=reaction force value(before correction)×$(TTW2/100)$ When actual headway distance L is greater than second headway distance threshold $L*2(L>L*2)$, the value of target accelerator pedal reaction force rp (auxiliary operation reaction force) becomes 0.

Also, when another preceding vehicle enters between the given vehicle and the original preceding vehicle, and when switching is made from control of another headway distance controller (ACC), not shown in the figure, to control of the present embodiment, so that the detected headway distance suddenly breaks second headway distance threshold $L*_2$, "the reaction force value is increased to reaction force value C at variation rate c, and after holding time t2 at reaction force value C has elapsed, the reaction force value is reduced to D at variation rate d", and series of auxiliary reaction force operations are executed while target accelerator pedal reaction force τp is computed. Here, when it is judged that the time until breaking of the computing condition of the principal operation reaction force (first headway distance threshold $L*_1$) is short, for example, when it is judged that the headway distance will break first headway distance threshold $L*_1$ after 1 sec, the principal operation reaction force alone may be computed. As a result, the principal operation reaction force can be efficiently transmitted to the driver.

The Principal Operation Reaction Force

Figure 15:
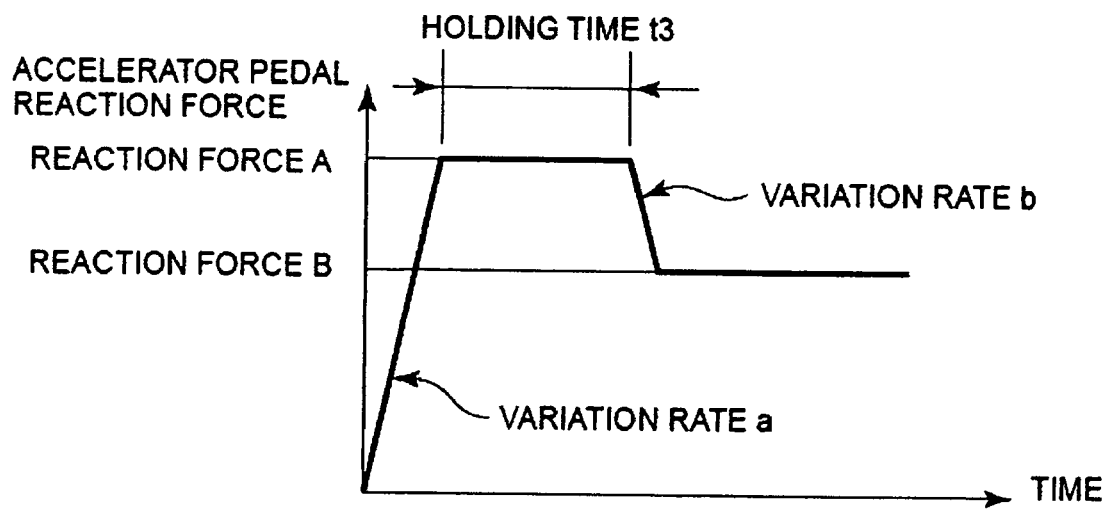
FIG. 15 is a diagram illustrating the time chart of the control of the principal operation reaction force.

For headway distance maintenance supporting system 1 in this embodiment, when actual headway distance L is less than first headway distance threshold $L*_1(L≦L*_1)$, target accelerator pedal reaction force (principal operation reaction force) τm is generated. The principal operation reaction force is also called the principal reaction force. As the scenario for generating the principal operation reaction force, when the preceding vehicle is approached, the proximity degree is assumed to be such that the driver should depress the brake pedal, and the system supports shifting of the foot from the accelerator pedal to the brake pedal. Target accelerator pedal reaction force τm is computed in step S700 shown in FIG. 4. More specifically, this target accelerator pedal reaction force m is generated as shown in FIG. 15.

In the following, the operation of the principal operation reaction force will be explained. First, the principal operation reaction force is generated at a prescribed variation rate a until a prescribed reaction force value A is achieved. After a prescribed holding time t3 during which reaction force value A is held constant, the accelerator pedal reaction force is decreased at a prescribed variation rate b until reaching prescribed reaction force value B. For example, the reaction force value A is considered to be a value that enables the driver to easily notice the reaction force, variation rate a is approximately the speed of shifting the foot to the brake pedal, and holding time t3 is set at about 0.5 sec.

Also, when the accelerator pedal operation amount (depression distance) is small, it becomes difficult to communicate the change in operation reaction force to the driver. Just as in the case of reaction forces C, D in the auxiliary operation reaction force (FIG. 13), a scheme can also be adopted in which reaction force value A is set corresponding to the accelerator pedal operation amount, so that the smaller the accelerator pedal operation amount, the larger the reaction force value A. As a result, the principal operation reaction force can be effective, and it is possible to minimize any uneasy feeling.

As a result, it is possible to assist the operation of the driver in shifting the foot from the accelerator pedal to the brake pedal. Also, reaction force value B is set at a value smaller than reaction force value A by multiplying reaction force value A by a prescribed gain (gain Ka).

Reaction Force Value B=Reaction Force Value A×Ka

Figure 16:
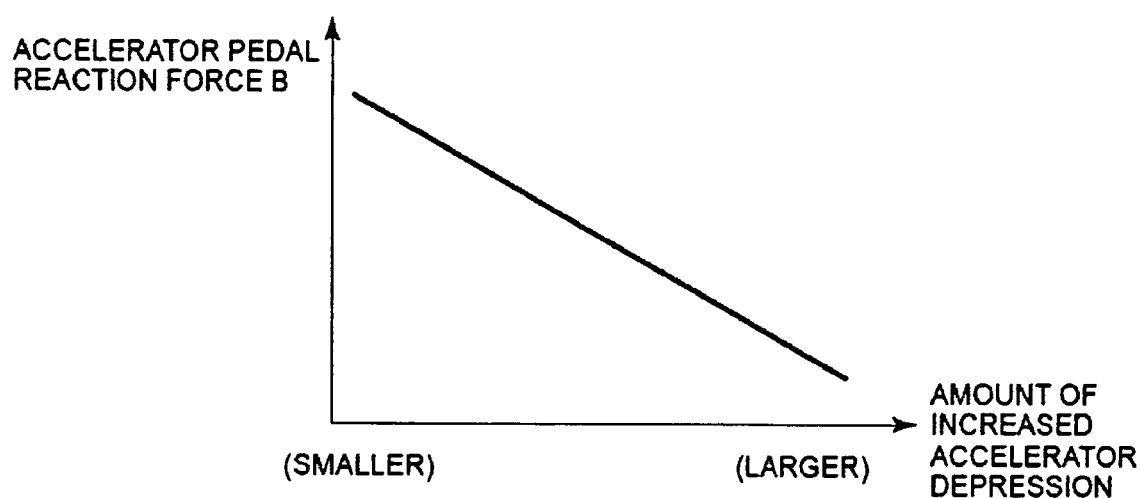
FIG. 16 is a diagram illustrating the relationship between the reaction force value B and the depression increment of the accelerator pedal.

Here, gain Ka is a value corresponding to the increased amount of depression of the accelerator pedal depression by the driver. For example, the maximum value of gain Ka is set at 0.8, and the value decreases as the depression increment of the accelerator pedal by the driver (for example, the increase in the throttle opening with reference to the throttle opening at the time that application of the principal operation reaction force at a variation rate was started). The relationship between reaction force value B and the depression increment of the accelerator pedal is shown in FIG. 16.

As a result, after application of the principal operation reaction force as reaction force value A for holding time t3, the principal operation reaction force is lowered to reaction force value B. Consequently, while the principal operation reaction force can be effectively noticed by the driver, when the given vehicle tries to pass, it is possible to eliminate the influence on accelerator operation by a driver intending to accelerate. Also, when the accelerator pedal is depressed as intended by the driver, the operation reaction force of the accelerator pedal is further reduced, and it is possible to minimize any uneasy feeling due to excessive operation reaction force.

When actual headway distance L is greater than first headway distance threshold $L*_1$ $(L>L*_1)$, the value of target accelerator pedal reaction force τm is set at 0.

Final target accelerator pedal reaction force τ is determined in step S800 and accelerator pedal reaction force controller 60 controls the reaction force generated in accelerator pedal 62. The final target accelerator pedal reaction force is obtained as the result of selecting the higher of auxiliary operation reaction force and principal operation reaction force, as shown in the following equation.

$$\tau=\max(\tau p,\tau m) \quad (15)$$

Headway distance maintenance supporting system 1 in Embodiment 1 realizes the following operation and effects.

(1) The auxiliary operation reaction force no greater than the principal operation reaction force is applied before the application of the principal operation reaction force. Consequently, even when the auxiliary operation reaction force is applied, the principal operation reaction force can still be effectively noticed by the driver efficiently. Also, after the principal operation reaction force is applied lasting for a prescribed time at reaction force value A, the level of the operation reaction force is lowered (such that an auxiliary operation reaction force is applied as reaction force value B that is less than reaction force value A). Consequently, while the principal operation reaction force can be efficiently noticed by the driver, it is possible to eliminate the influence of a driver who intends to accelerate on the accelerator operation, and to minimize any uneasy feeling, when the driver wants to pass the preceding vehicle. Thus headway distance maintenance supporting system 1 of this embodiment makes it possible to effectively gain the driver's awareness of the principal operation reaction force.

(2) The configuration is such that when actual headway distance L is less than first headway distance threshold $L^*_1$, target accelerator pedal reaction force τm (principal operation reaction force) is generated. As a result, for example, when the preceding vehicle becomes closer and the driver should perform a braking operation, application of the principal operation reaction force can more reliably arouse the notice of the driver, so that this supports shifting of the driver's foot from the accelerator pedal to the brake pedal.

(3) The configuration is such that when actual headway distance L is less than a second headway distance threshold $L^*_2$, target accelerator pedal reaction force τp (auxiliary operation reaction force) is generated before the principal operation reaction force is generated. As a result, for example, when the preceding vehicle becomes closer and it is possible to maintain the headway distance with accelerator operation, the application of the auxiliary operation reaction force prompts the driver to lift the foot from the accelerator pedal, so that the headway distance can still be maintained even when the driver does not perform a braking operation.

(4) The configuration is such that when the auxiliary operation reaction force is generated, the reaction force value rises to reaction force value C at variation rate c. As a result, it is possible to minimize any uneasy feeling on the part of the driver.

(5) The configuration is such that the auxiliary operation reaction force is gradually decreased before generation of the principal operation reaction force. As a result, while driver uneasiness is minimized by reducing the auxiliary operation reaction force so that the operation reaction force is released, it is possible to increase the difference in the level between the operation reaction force and the later principal operation reaction force, so that the principal operation reaction force can be efficiently noticed. In particular, because the rate of decrease (variation rate d) of the operation reaction force when the auxiliary operation reaction force is decreased is lower then the rate of increase (variation rate c) of the operation reaction force when the auxiliary operation reaction force is generated, it is possible to effectively minimize any driver uneasiness as the auxiliary operation reaction force is decreased to release the operation reaction force.

(6) With a configuration that increases reaction force value A when the accelerator pedal operation amount (depression amount) is smaller, it is possible to get the driver to notice the principal operation reaction force appropriately corresponding to the accelerator pedal operation amount.

(7) The configuration is such that the variation rate a when the principal operation reaction force is generated becomes approximately the speed of shifting the foot to the brake pedal when the principal operation reaction force is generated. As a result, it is possible to communicate the generation of the principal operation reaction force to the driver with high reliability, and at the same time, it is possible to prompt the driver to shift the foot between the pedals.

(8) The configuration is such that as the accelerator pedal depression amount is increased, gain Ka decreases, and reaction force value B of the principal operation reaction force is decreased. As a result, when the accelerator pedal depression distance is increased as intended by the driver, it is possible to alleviate any uneasiness caused by excessive operation reaction force.

Embodiment 2

In the following, the headway distance maintenance supporting system and method according to another embodiment (Embodiment 2) of the present invention will be explained with reference to FIGS. 17-21. In headway distance maintenance supporting system 1 of Embodiment 2, in addition, if the driver does not depress the accelerator pedal, control is performed to decelerate the given vehicle under prescribed conditions. This feature is different from Embodiment 1. In the following explanation, the features that differ will be emphasized, and symbols that are the same as those used in Embodiment 1 will be adopted as is. The features not explained here are the same as those in Embodiment 1.

Figure 17:
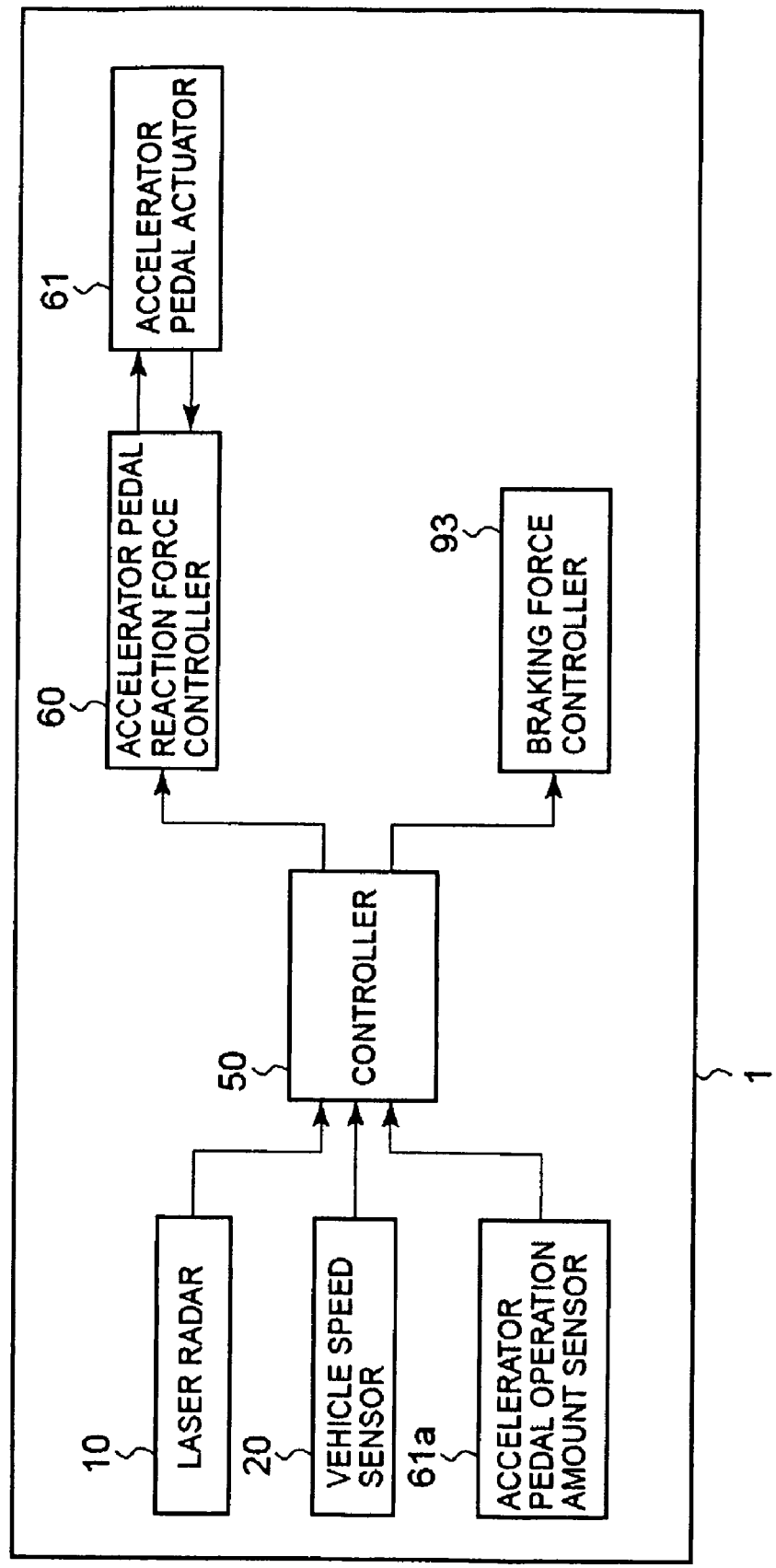
FIG. 17 is a system diagram showing the headway distance maintenance supporting system according to another embodiment of the present invention.
Figure 18:
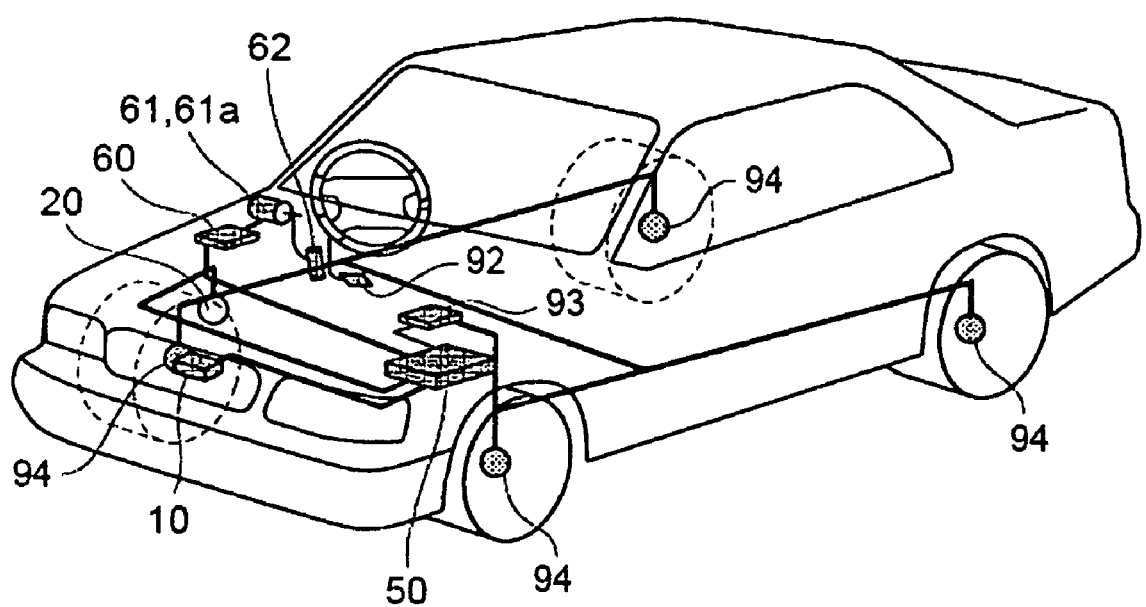
FIG. 18 is a diagram schematically showing a vehicle that carries the headway distance maintenance supporting system according to another embodiment of the present invention.

FIG. 17 is a system diagram showing the headway distance maintenance supporting system 1 according to another embodiment of the present invention (Embodiment 2). FIG. 18 is a diagram schematically showing a vehicle that carries headway distance maintenance supporting system 1. Here, 92 represents the brake pedal; 93 represents the braking force controller; and 94 represents the braking device such as a hydraulic brake provided at each wheel.

Controller 50 computes the target deceleration rate based on second headway distance threshold $L^*_2$ and the operation state of accelerator pedal 62. Also, controller 50 computes the target brake hydraulic pressure based on the computed target deceleration rate, and this is output to braking force controller 93. Braking force controller 93 generates a brake hydraulic pressure so that the target brake hydraulic pressure output from controller 50 is reached, and the hydraulic pressure for braking is fed to braking device 94. As a result, the given vehicle is decelerated at the target deceleration rate.

Figure 19:
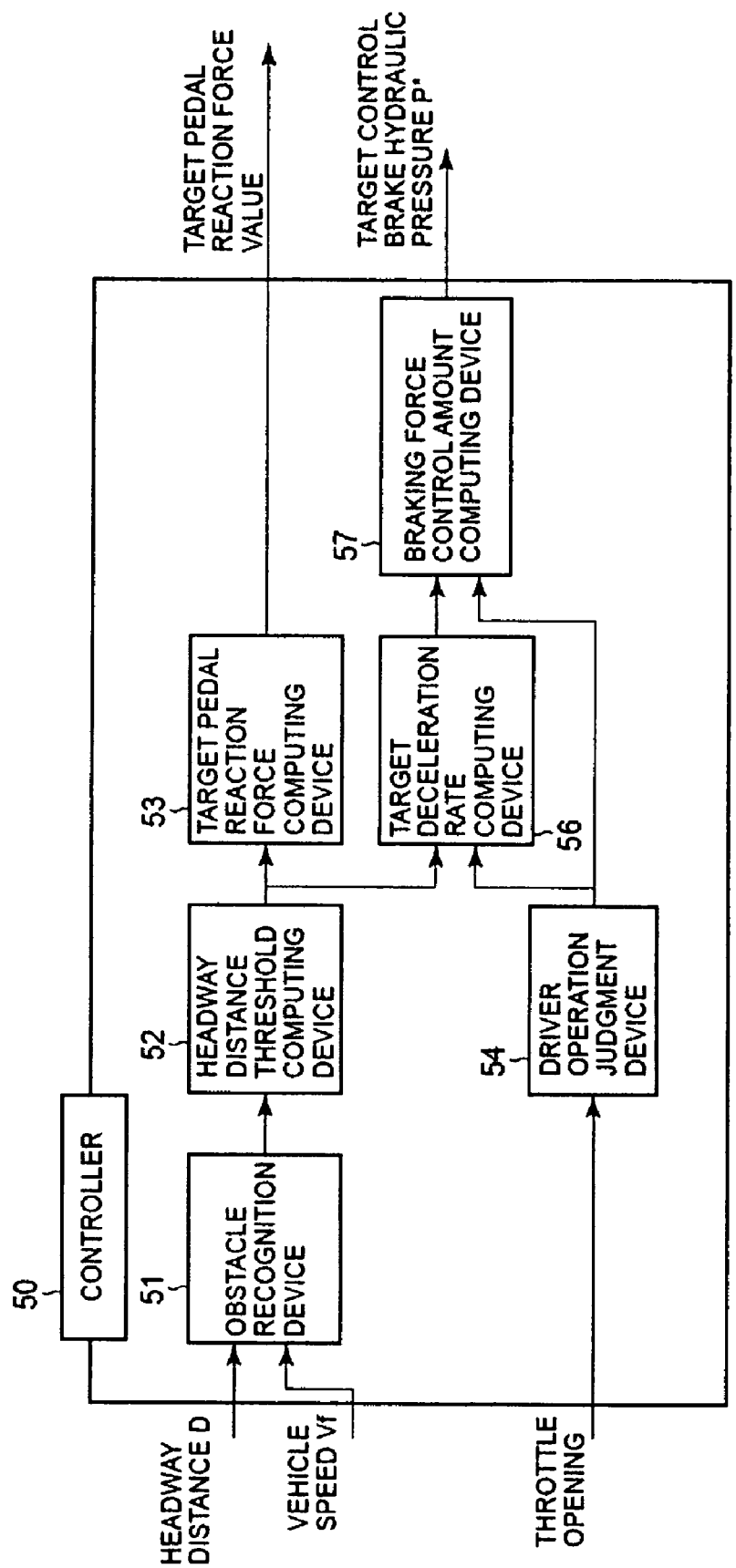
FIG. 19 is a block diagram showing the controller of the headway distance maintenance supporting system according to another embodiment of the present invention.

FIG. 19 is a block diagram showing controller 50 of the headway distance maintenance supporting system according to another embodiment of the present invention. Target deceleration rate computing device 56 computes the target deceleration rate generated for the given vehicle based on second headway distance threshold $L^*_2$ computed by headway distance threshold computing device 52 and the status of accelerator operation by the driver judged by driver operation judgment device 54. Braking force control amount computing device 57 computes the target brake hydraulic pressure based on the target deceleration rate computed by target deceleration rate computing device 56 and the status of accelerator operation by the driver judged by driver operation judgment device 54.

Figure 20:
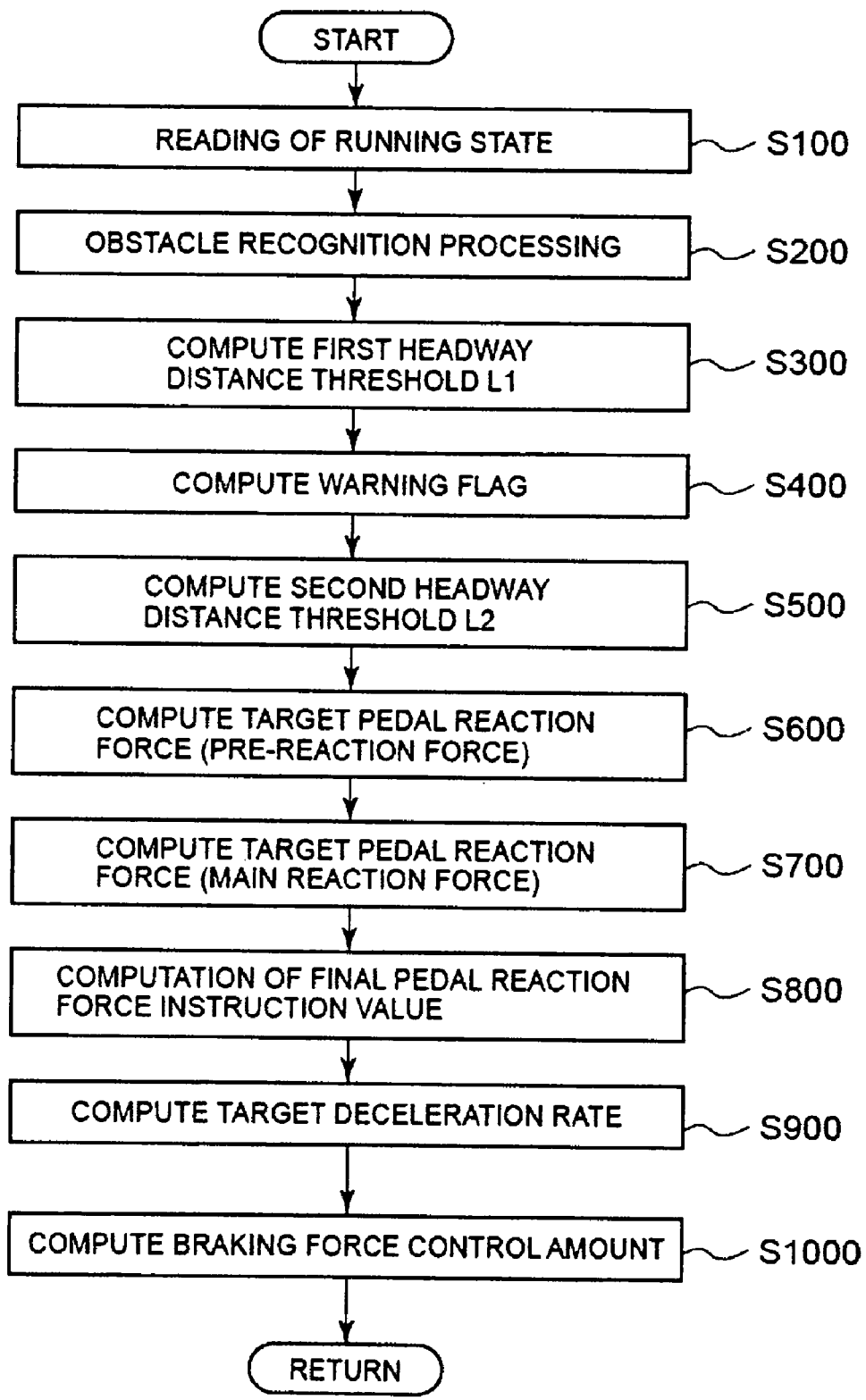
FIG. 20 is a flow chart illustrating a process of headway distance maintenance supporting control of another embodiment of the present invention.

FIG. 20 is a flow chart illustrating a process of the headway distance maintenance supporting control performed by controller 50 in Embodiment 2. Unlike in Embodiment 1, the following processing steps are added: target deceleration rate computing process in step S900, and braking force control amount computing process in step S1000.

Figure 21:
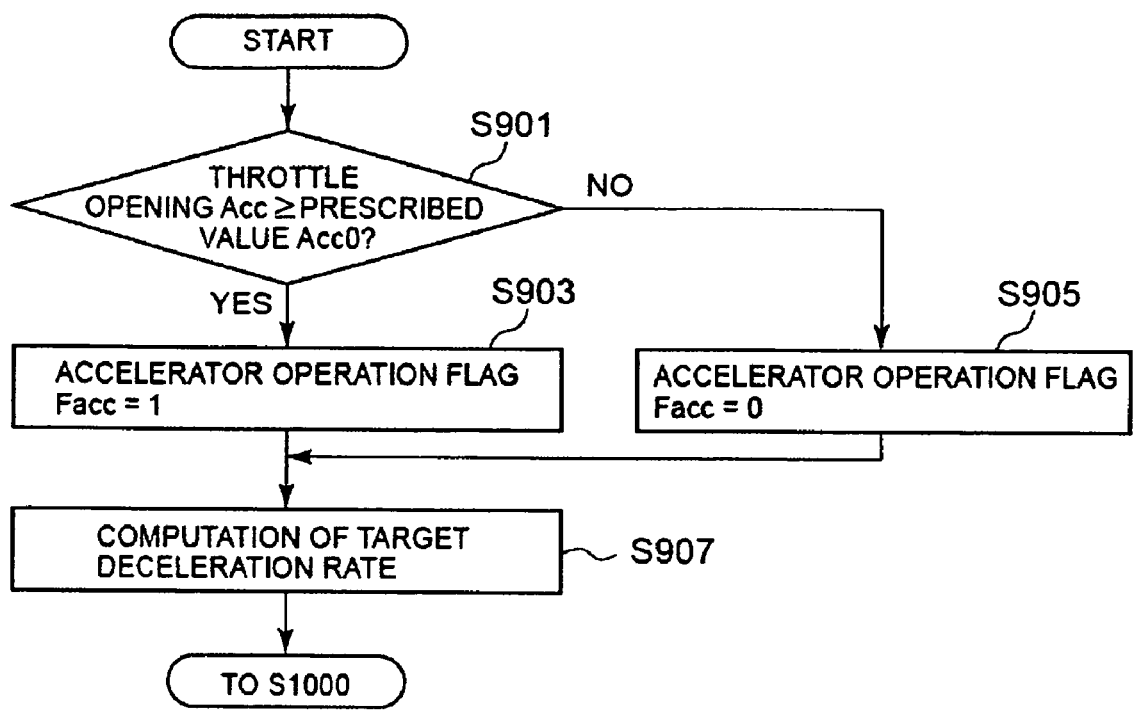
FIG. 21 is a flow chart illustrating the processing procedure of step S900 of FIG. 20.

In the following, the processing performed in step S900 will be explained with reference to the flow chart shown in FIG. 21. In step S901, judgment is made as to whether throttle opening Acc exceeds prescribed value Acc0. If the judgment result in step S901 is YES, the process proceeds to step S903, and accelerator operation flag Facc is set to 1. On the other hand, if the judgment result in step S901 is NO, the process proceeds to step S905, and accelerator operation flag Facc is cleared. Here, accelerator operation judgment threshold Acc0 for judging whether the accelerator is in the fully closed state is set at a small value.

In step S907, target deceleration rate $\alpha^*_2$ is computed according to second headway distance threshold $L^*_2$ and the accelerator operation performed by the driver judged in step S901.

(1) In the case of accelerator operation (Facc=1)

$$\alpha^*_2=0$$

(2) In the case of no accelerator operation (Facc=0)

$$\alpha^*_2=Kv \times Kr2 \times (L^*_2-L)$$

Here, Kr2 represents the gain for computing the target deceleration rate generated in the given vehicle. Also, $\alpha^*_2$ has a positive value in case of acceleration, and it has a negative value in case of deceleration. Also, a variation limit of $\Delta\alpha^*_2$ may be set in target deceleration rate $\alpha^*_2 2$.

In step S1000, the braking force control amount is computed corresponding to second target deceleration rate $\alpha^*2$ computed in step S900. First of all, deceleration $\alpha^*$eng generated by the engine brake is subtracted from target deceleration rate $\alpha^*2$ to compute target deceleration rate $\alpha^*$brk generated by the brake (braking device).

(1) In the case of accelerator operation (Facc=1)

$$\alpha^*brk=0$$

(2) In the case of no accelerator operation (Facc=0)

$$\alpha^*brk=\alpha^*+\alpha^*eng$$

Here, $\alpha^*$brk, $\alpha^*$eng take positive values in acceleration, and negative values in deceleration.

Then, from target deceleration rate $\alpha^*$brk generated by the brake, target brake hydraulic pressure P* is computed.

(1) In the case of accelerator operation (Facc=1)

$$P^*=0$$

(2) In the case of no accelerator operation (Facc=0)

$$P^*=-(Kb \times \alpha^*brk)$$

Here, Kb represents the gain for converting the target deceleration rate to the target brake hydraulic pressure, and it is determined according to the various parameters of the given vehicle. Braking force controller 93 generates the brake hydraulic pressure so as to reach the target brake hydraulic pressure P*.

In the control operation for headway distance maintenance supporting system 1 in this embodiment, when headway distance L (actual headway distance) detected by laser radar 10 becomes less than second headway distance threshold $L^*_2$, an auxiliary operation reaction force is applied on accelerator pedal 62 if the driver depresses accelerator pedal 62 (Facc=1). On the other hand, if the driver did not depress accelerator pedal 62 (Facc=0), or the driver, who has noticed the auxiliary operation reaction force, releases accelerator pedal 62 from the prescribed opening (Acc0) to give Facc=0, the deceleration control is performed so that the given vehicle is decelerated at second target deceleration rate $\alpha^*_2$.

In the Embodiment 2, the following operation and effects can be realized in addition to the operation and effects of the Embodiment 1.

(1) The configuration is such that when headway distance (actual headway distance) L detected by the laser radar is less than second headway distance threshold $L^*_2$, an auxiliary operation reaction force is applied on the accelerator pedal if the driver depresses it. On the other hand, if the driver did not depress the accelerator pedal, the given vehicle's deceleration control is performed. Consequently, when actual headway distance L becomes shorter than second headway distance threshold $L^*_2$, if the driver depresses the accelerator pedal, the driver is prompted to release the accelerator pedal, and as the driver shifts the foot away from the accelerator pedal deceleration control can be performed. As a result, maintenance of the headway distance can be effectively supported such as when approaching a preceding vehicle.

(2) The configuration is such that the deceleration control is not performed when the driver depresses the accelerator pedal. Consequently, it is possible to prevent simultaneous acceleration control and deceleration control. As a result, accelerator of the given vehicle is not hampered, and the given vehicle can be accelerator d as desired by the driver. Consequently, the driver does not feel uneasy.

Modified Examples (1) As explained above, when the principal operation reaction force is generated, the accelerator pedal reaction force is decreased from reaction force value A to reaction force value B at a prescribed variation rate b. However, the present invention is not limited to this scheme. For example, variation rate b may be changed corresponding to the intention of the driver. As a result, it is possible to generate the operation reaction force corresponding to the intention of the driver to accelerator. Consequently, it is possible to reduce uneasiness during the accelerator operation. Here, with regard to the driver intention to accelerator, when it is detected that the accelerator pedal is further depressed (increased depression), for example, it is judged that the driver intends to accelerate.

Figure 22:
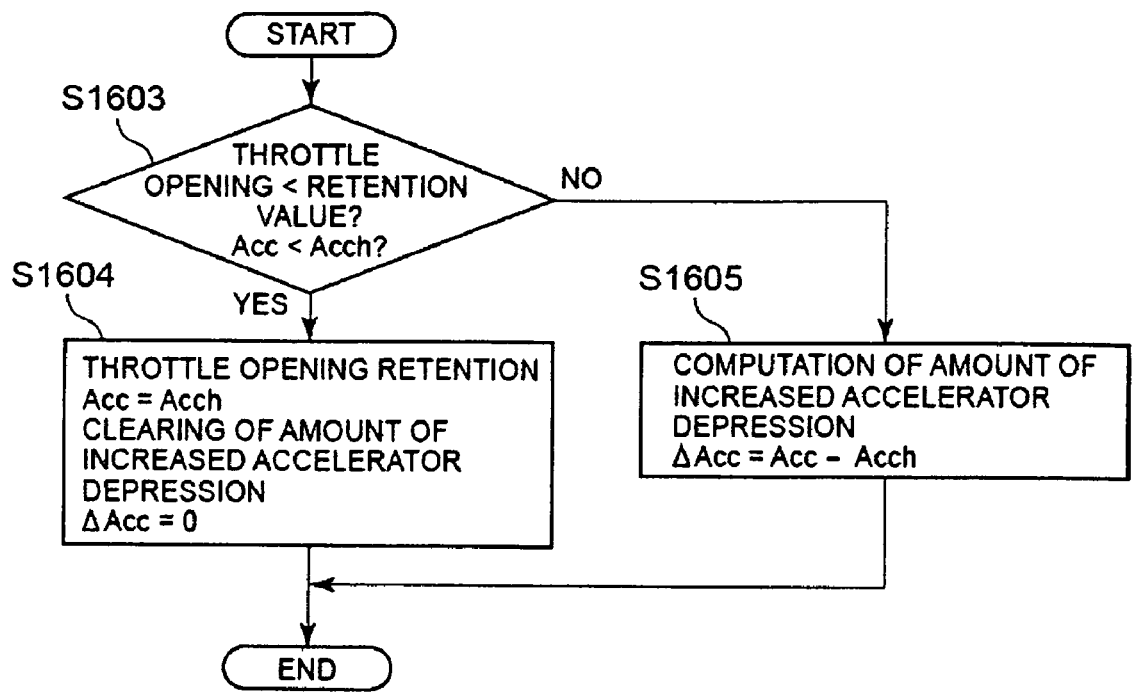
FIG. 22 is a flow chart illustrating a process of headway distance maintenance supporting control of another embodiment of the present invention.

Here, for example, by computing the increased amount of depression of the accelerator pedal and to increase variation rate b (to a larger value) when the increased amount of depression is larger, it is possible to alleviate uneasiness if driver has an intention to accelerate. With regard to computation of the depression increment, just as in the case of computing the depression increment of the accelerator pedal taken into consideration when gain Ka for computing reaction force value B is determined, it may, for example, be computed as the increase in throttle opening with reference to the throttle opening at the time that application of the principal operation reaction force at variation rate a was started. Also, it may be determined according to the procedure shown in the flow chart of FIG. 22. In step S1603, judgment is made on whether throttle opening Acc is smaller than throttle opening retention value Acch. If the judgment result in step S1603 is YES, the process proceeds to step S1604, throttle opening Acc is set at throttle opening retention value Acch, and accelerator depression increment ΔAcc is cleared. On the other hand, if the judgment result in step S1603 is NO, the process proceeds to step S1605, and increased amount of depression ΔAcc is computed using the following equation.

$$\Delta Acc=Acc-Acch$$

In step S1605, because throttle opening retention value Acch is not refreshed, accelerator depression increment ΔAcc is computed with reference to throttle opening retention value Acch last refreshed in step S1604. That is, in step S1605, accelerator depression increment ΔAcc is computed with reference to the operation amount of the accelerator pedal when depression increment of the accelerator pedal is started.

A scheme can also be adopted in which instead of accelerator depression increment ΔAcc, variation rate b is made higher (larger) when throttle opening Acc is larger, and the same operation and effects as described above can be realized.

As another judgment reference of the intention of the driver to accelerate, for example, the presence/absence of turn signal operation, the positional relationship with the preceding vehicle in the lateral direction (the intention to change lanes), etc. can be used. For example, a scheme can also be adopted in which the higher the accelerator opening speed is, the higher is the variation rate b. Also, when turn signal operation is detected, the value may be taken to be larger by a prescribed value b than the value before detection of the turn signal operation. Also, for the position relationship with the preceding vehicle in the lateral direction, for example, the tendency to lose the preceding vehicle is determined according to Japanese Patent No. 3778165 in the related art, and variation rate b is increased when the tendency to lose the preceding vehicle is more significant, so that it is possible to reduce uneasiness.

(2) In the above explanation, variation rate a when the principal operation reaction force is generated has a prescribed value (variation rate). However, it is also possible that when the depression amount of the accelerator pedal is small, it might be difficult to transmit the information that the principal operation reaction force is being generated to the driver. Here, just as with variation rate c when the auxiliary operation reaction force is generated, a scheme can also be adopted in which the smaller the throttle opening, the higher the variation rate a. As a result, it is possible to apply the principal operation reaction force effectively, and to alleviate uneasiness.

(3) As explained above, for the various reaction forces A, B, C, D, when a depression increment of the accelerator pedal is detected, the reaction forces are gradually decreased at a prescribed variation rate. As a result, it is possible to decrease the reaction force corresponding to the depression increment in operation of the accelerator pedal by the driver, and it is possible to alleviate driver uneasiness when depressing the accelerator pedal further.

(4) In the above explanation, no specific description was given of the feature of change of reaction force values A, B of the principal operation reaction force corresponding to the road surface gradient. However, just as in the case of reaction force values C, D in the auxiliary operation reaction force, a scheme can also be adopted in which reaction force values A, B are changed corresponding to the gradient of the road surface. When the given vehicle runs uphill, by reducing reaction force values A, B according to the gradient of the slope, excessive accelerator pedal reaction force can be prevented, alleviating uneasiness. Also, the gradient can be estimated from Equation (11) in step S510 explained above.

(5) As explained above, in step S800, when final target accelerator pedal reaction force X is determined, the result of processing to select the higher of the auxiliary operation reaction force and the principal operation reaction force is taken as final target accelerator pedal reaction force τ. However, the present invention is not limited to this scheme. For example, a scheme can also be adopted in which, based on actual headway distance L, either the auxiliary operation reaction force and the principal operation reaction force is determined to be final target accelerator pedal reaction force τ. That is, the following scheme can also be adopted: when actual headway distance L is greater than first headway distance threshold $L^*_1$, while it is less than second headway distance threshold $L^*_2$ ($L^*_1 < L \leq L^*_2$), the auxiliary operation reaction force is taken as final target accelerator pedal reaction force τ, and when actual headway distance L is less than first headway distance threshold $L^*_1$ ($L \leq L^*_1$), the principal operation reaction force is taken as final target accelerator pedal reaction force τ.

(6) In the Embodiment 2, the given vehicle is decelerated by supplying a brake hydraulic pressure to braking device 94. However, the following scheme can be adopted: the given vehicle is decelerated by engine braking, downshifting or another deceleration control scheme.

(7) In the Embodiment 2, both the timing for starting generation of the auxiliary operation reaction force and the timing for starting deceleration control have actual headway distance L being less than second headway distance threshold $L^*_2$. However, the present invention is not limited to this scheme. For example, the following scheme can be adopted: a third headway distance threshold greater than second headway distance threshold $L^*_2$ is set, and the timing for starting deceleration control is appropriate when actual headway distance L becomes shorter than the third headway distance threshold.

(8) As explained above, for the timing of starting generation of the auxiliary operation reaction force, actual headway distance L becomes second headway distance threshold $L^*_2$ or less. However, the present invention is not limited to this scheme. For example, the following scheme can be adopted: the time at which actual headway distance L becomes less than first headway distance threshold $L^*_1$ is predicted, and a time ahead of this time by a prescribed interval is taken as the timing for starting generation of the auxiliary operation reaction force. Also, for example, when it is predicted that actual headway distance L will reach first headway distance threshold $L^*_1$ or less, when actual headway distance L becomes (first headway distance threshold $L^*_1$)+(a prescribed distance) or shorter, this is taken as the timing for starting generation of the auxiliary operation reaction force.

(9) As explained above, the configuration is such that the auxiliary operation reaction force is generated before generating the principal operation reaction force, and with regard to the principal operation reaction force, the level of the operation reaction force is decreased (so that the principal operation reaction force is decreased) after the principal operation reaction force continues for a prescribed time. However, the present invention is not limited to this. A scheme can also be adopted in which control is performed such that the auxiliary operation reaction force alone is generated, and control for decreasing the principal operation reaction force is not performed, or control is performed such that no auxiliary operation reaction force is generated, and control is performed to decrease the principal operation reaction force. That is, it is not a necessity to perform both control for generation of the auxiliary operation reaction force and control for decreasing the principal operation reaction force. It is also possible to perform only one of them.

(10) In the above explanation, accelerator pedal 62 is presented as an example of the driving operation equipment. However, the present invention is not limited to this scheme. For example, the present invention may also be adopted for various types of driving operation equipment for controlling accelerator of the given vehicle according to the operation amount or for controlling accelerator/deceleration, such as the so-called joystick or operating lever.

(11) The aforementioned embodiments and modified examples may be combined in applications.

In the embodiments and their modified examples, for example, the obstacle detecting means corresponds to laser radar 10 and its equivalents; the operation reaction force generating means corresponds to accelerator pedal reaction force controller 60 and accelerator pedal actuator 61 and their equivalents; and the accelerator pedal operation amount detecting means corresponds to sensor 61a and its equivalents. The control means corresponds to controller 50 and the control program executed by controller 50 and their equivalents. However, the above explanation is merely an example. In the explanation of the present invention, there are no restrictions on the correspondence relationship between the descriptive items in the embodiment and the descriptive items in the claims.

Given the disclosure of the present invention, one versed in the art would appreciate that there may be other embodiments and modifications within the scope of the invention. Accordingly, all modifications attainable by one versed in the art from the present disclosure within the scope of the present invention are to be included as further embodiments of the present invention. The scope of the present invention is to be defined as set forth in the following claims.

What is claimed is:

1. A headway distance maintenance supporting system for a given vehicle, comprising:
an obstacle detector configured to detect a status of an obstacle present in front of the given vehicle;
a controller configured to determine an operation reaction force to be generated in a driving operation equipment used by a driver of the given vehicle, the operation reaction force being a tactile force transmitted to the driver via the driving operation equipment; and
an operation reaction force generator configured to generate said operation reaction force in said driving operation equipment based on said operation reaction force determined by the controller such that the driving operation equipment transmits the tactile force to the driver,
wherein the controller is configured to control said operation reaction force generated by said operation reaction force generator in said driving operation equipment based on a status of a detected obstacle detected by the obstacle detector,
wherein the operation reaction force determined by the controller comprises a principal operation reaction force and an auxiliary operation reaction force, the auxiliary operation reaction force being no greater than the principal operation reaction force, and
wherein the controller is configured to generate the auxiliary operation reaction force before a generation of the principal operation reaction force in the driving operation equipment.

2. The headway distance maintenance supporting system according to claim 1, wherein said controller is configured to control the operation reaction force to generate said principal operation reaction force when a distance from the given vehicle to the obstacle present in front of the given vehicle is detected to be less than a first headway distance threshold.

3. The headway distance maintenance supporting system according to claim 1, further comprising an operation amount detector configured to detect an operation amount of said driving operation equipment, and
wherein said controller is configured to control said auxiliary operation reaction force based on the operation amount of said driving operation equipment.

4. The headway distance maintenance supporting system according to claim 1, further comprising a gradient detector configured to detect a gradient of a road, and
wherein said controller is configured to control the auxiliary operation reaction force based on said gradient.

5. The headway distance maintenance supporting system according to claim 1, wherein said controller is configured to compute arrival time until the principal operation reaction force is generated, and to determine said auxiliary operation reaction force based on said arrival time.

6. The headway distance maintenance supporting system according to claim 1, wherein said controller is configured to control said operation reaction force generator such that the operation reaction force is gradually increased to become said auxiliary operation reaction force when said auxiliary operation reaction force is generated in said driving operation equipment.

7. The headway distance maintenance supporting system according to claim 1, wherein said controller is configured to control said operation reaction force such that after said auxiliary operation reaction force is generated, said auxiliary operation reaction force is gradually decreased, and then said principal operation reaction force is generated in said driving operation equipment.

8. The headway distance maintenance supporting system according to claim 1, wherein said controller is configured to control said operation reaction force generator such that when said auxiliary operation reaction force is generated in said driving operation equipment, the operation reaction force is gradually increased at a prescribed variation rate to become said auxiliary operation reaction force, and then, said auxiliary operation reaction force is gradually decreased at a rate lower than said prescribed variation rate, followed by generation of said principal operation reaction force.

9. The headway distance maintenance supporting system according to claim 1, further comprising an operation amount detector configured to detect an operation amount of said driving operation equipment, and
wherein said controller is configured to determine said principal operation reaction force based on the operation amount of said driving operation equipment.

10. The headway distance maintenance supporting system according to claim 1, further comprising a gradient detector configured to detect a gradient of the road where the vehicle runs, and
wherein said controller is configured to control said principal operation reaction force based on said gradient.

11. The headway distance maintenance supporting system according to claim 1, wherein said controller is configured to control said operation reaction force generator such that the operation reaction force generated by said operation reaction force generator is gradually increased to become said principal operation reaction force when said principal operation reaction force is generated in said driving operation equipment.

12. A headway distance maintenance supporting system for a given vehicle, comprising:
an obstacle detecting means for detecting a status of an obstacle present in front of the given vehicle;
a controlling means for determining an operation reaction force generated in a driving operation equipment used by a driver of the given vehicle, the operation reaction force being a tactile force transmitted to the driver via the driving operation equipment; and
an operation reaction force generating means for generating said operation reaction force in said driving operation equipment based on said operation reaction force determined by the controlling means such that the driving operation equipment transmits the tactile force to the driver,
wherein the controlling means is configured to control said operation reaction force generated by said operation reaction force generating means in said driving operation equipment based on a status of a detected obstacle detected by the obstacle detecting means,
wherein the operation reaction force determined by the controlling means comprises a principal operation reaction force and an auxiliary operation reaction force, the auxiliary operation reaction force being no greater than the principal operation reaction force, and
wherein the controlling means is configured to generate the auxiliary operation reaction force before a generation of the principal operation reaction force in the driving operation equipment.

13. A headway distance maintenance supporting method for a given vehicle, comprising:

detecting a status of at least one obstacle present in front of the given vehicle;

computing a principal operation reaction force and an auxiliary operation reaction force no greater than said principal operation reaction force generated in a driving operation equipment used by the driver of the given vehicle based on the status of the detected obstacle, the principal and auxiliary operation reaction forces being tactile forces transmitted to the driver via the driving operation equipment; and generating the auxiliary operation reaction force before generating the principal operation reaction force in the driving operation equipment such that the driving operation equipment transmits the auxiliary operation reaction force to the driver.

14. A computer readable storage medium, having stored data for headway distance maintenance support control for a given vehicle, wherein the computer readable storage medium stores a program for providing:

instructions for detecting a status of an obstacle present in front of the given vehicle;

instructions for computing a principal operation reaction force and an auxiliary operation reaction force no greater than said principal operation reaction force generated in a driving operation equipment used by a driver of the given vehicle based on a status of a detected obstacle, the principal and auxiliary operation reaction forces being tactile forces transmitted to the driver via the driving operation equipment; and instructions for generating the auxiliary operation reaction force before generating the principal operation reaction force in the driving operation equipment such that the driving operation equipment transmits the auxiliary operation reaction force to the driver.

15. The headway distance maintenance supporting system according to claim 1, wherein the auxiliary operation reaction force is an auxiliary accelerator pedal reaction force and the principal operation reaction force is a principal acceleration pedal reaction force.

16. The headway distance maintenance supporting method according to claim 13, wherein the auxiliary operation reaction force is an auxiliary accelerator pedal reaction force and the principal operation reaction force is a principal acceleration pedal reaction force.

17. The computer readable storage medium according to claim 14, wherein the auxiliary operation reaction force is an auxiliary accelerator pedal reaction force and the principal operation reaction force is a principal acceleration pedal reaction force.

18. The computer readable storage medium according to claim 14, wherein the computer readable storage medium is a non-transitory storage medium.

* * * * *